United States Patent
Bartling

(10) Patent No.: US 11,385,996 B1
(45) Date of Patent: Jul. 12, 2022

(54) MONITORING EXECUTION OF SOFTWARE USING ONLINE PATH SIGNATURES

(71) Applicant: Arm Limited, Cambridge (GB)

(72) Inventor: Michael Bartling, Austin, TX (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/319,241

(22) Filed: May 13, 2021

(51) Int. Cl.
  *G06F 11/36* (2006.01)
  *G06F 21/78* (2013.01)
  *G06F 21/53* (2013.01)
  *G06F 21/60* (2013.01)

(52) U.S. Cl.
  CPC ...... *G06F 11/3688* (2013.01); *G06F 11/3676* (2013.01); *G06F 11/3692* (2013.01); *G06F 21/53* (2013.01); *G06F 21/602* (2013.01); *G06F 21/78* (2013.01)

(58) Field of Classification Search
  None
  See application file for complete search history.

(56) References Cited

U.S. PATENT DOCUMENTS

| | | | | |
|---|---|---|---|---|
| 7,950,056 B1 * | 5/2011 | Satish | ................... | G06F 21/554 709/224 |
| 2005/0182958 A1 * | 8/2005 | Pham | ..................... | G06F 21/51 726/1 |

OTHER PUBLICATIONS

Cunningham, "k-Nearest Neighbour Classifiers", 2020, Cornell University arXiv:2004 (Year: 2020).*
Giusti, "Iterated Integrals and Population Time Series Analysis", 2019, Topological Data Analysis, Apr. 27, 2019 (Year: 2019).*
Wang et al., "Hashing for Similarity Search: A Survey", arXiv preprint arXiv: 1408.2927, 2014—arxiv.org, Aug. 13, 2014, 29 pages.
Giusti et al., "Iterated Integrals and Population Time Series Analysis", Topological Data Analysis, Apr. 27, 2019, 24 pages.

* cited by examiner

*Primary Examiner* — Hossain M Morshed
(74) *Attorney, Agent, or Firm* — Nixon & Vanderhye P.C.

(57) ABSTRACT

Techniques, supported by corresponding apparatuses and methods, are disclosed for monitoring execution of software and generating path signatures which are characteristic of the behaviour of the software. Multiple approximate nearest neighbour searching hash tables are generated in dependence on such path signatures. Observed path signatures are also compared against the previously generated content of these runtime multiple approximate nearest neighbour searching hash tables and a behavioural classification is determined in dependence on hash collision-based similarity between the observed path signature and the content of the multiple approximate nearest neighbour searching hash tables.

19 Claims, 15 Drawing Sheets

MONITORING EXECUTION OF SOFTWARE USING ONLINE PATH SIGNATURES

TECHNICAL FIELD

The present disclosure relates to data processing. In particular, the present disclosure relates to monitoring the execution of software using path signatures.

DESCRIPTION

Software execution may be monitored to determine if that execution is considered to be normal or whether something unusual appears to be happening. For example malware detection techniques may be used to determine if there are indications that a malicious actor is attempting to disrupt or corrupt the software execution and for purposes other than those intended by the programmer and end-user. However due to the complexity of contemporary software, it can be difficult to succinctly define what is normal and what is abnormal. Moreover correct, but rare, behaviours of the software may be misidentified by the monitoring as malicious and incorrectly categorised as such. These false positive identifications would ideally be reduced to a minimal level.

SUMMARY

One example described is an apparatus comprising:
event capturing circuitry to monitor execution of software and to generate a series of event data in dependence on the execution of the software;
path signature generation circuitry to generate an observed path signature dependent on the series of event data;
runtime hash table storage to store runtime approximate nearest neighbour searching hash tables;
hashing circuitry to perform a query-and-conditional-insert process on the runtime approximate nearest neighbour searching hash tables in dependence on the observed path signature; and
behaviour indication circuitry to indicate a behavioural classification of the observed path signature in dependence on hash collision-based similarity between the observed path signature and content of the runtime approximate nearest neighbour searching hash tables.

Another example described herein in a method of data processing comprising:
monitoring execution of software;
generating a series of event data in dependence on the execution of the software;
generating an observed path signature dependent on the series of event data;
storing runtime approximate nearest neighbour searching hash tables;
performing a query-and-conditional-insert process on the runtime approximate nearest neighbour searching hash tables in dependence on the observed path signature; and
indicating a behavioural classification of the observed path signature in dependence on hash collision-based similarity between the observed path signature and content of the runtime approximate nearest neighbour searching hash tables.

Another example described herein is a computer-readable storage medium storing in a non-transient fashion software which when executed on a computing device causes the computing device to carry out the steps of:
monitoring execution of software;
generating a series of event data in dependence on the execution of the software;
generating an observed path signature dependent on the series of event data;
storing runtime approximate nearest neighbour searching hash tables;
performing a query-and-conditional-insert process on the runtime approximate nearest neighbour searching hash tables in dependence on the observed path signature; and
indicating a behavioural classification of the observed path signature in dependence on hash collision-based similarity between the observed path signature and content of the runtime approximate nearest neighbour searching hash tables.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1A:
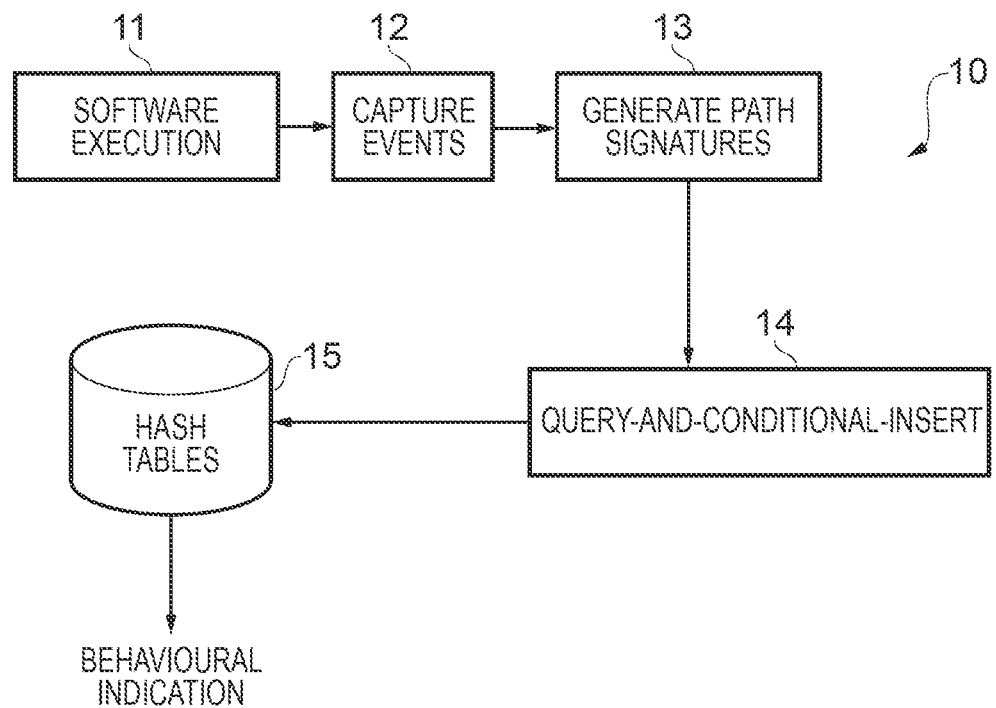
FIG. 1A schematically illustrates apparatus according to some example embodiments for monitoring software execution, generating path signatures, and performing a query-and-conditional-insert process on a set of hash tables.

Before discussing the embodiments with reference to the accompanying figures, the following description of embodiments is provided.

In accordance with one example configuration there is provided an apparatus comprising:
event capturing circuitry to monitor execution of software and to generate a series of event data in dependence on the execution of the software;
path signature generation circuitry to generate an observed path signature dependent on the series of event data;
runtime hash table storage to store runtime approximate nearest neighbour searching hash tables;
hashing circuitry to perform a query-and-conditional-insert process on the runtime approximate nearest neighbour searching hash tables in dependence on the observed path signature; and
behaviour indication circuitry to indicate a behavioural classification of the observed path signature in dependence on hash collision-based similarity between the observed path signature and content of the runtime approximate nearest neighbour searching hash tables.

The present techniques are based on the realisation that path signatures, constructs which stem from algebraic topology as an approach to analysing stochastic differential equations, can be a useful tool for time series classification tasks, in particular here for characterising behavioural signatures when software is executed (and these may be characteristic of known benign behaviour or of known malicious behaviour). Mathematically speaking, path signatures are invariant to shifts and functional re-parameterisations of the time series. They have various attractive features, such as that they can capture a high degree of non-linearity in the signals they are based on. Accordingly the present techniques disclose the use of path signatures in order to generate and store behavioural signatures which may correspond to a variety of run-time behaviour. For example, when executing the software in a trusted environment the path signatures may correspond to either acceptable run-time behaviour (when the software is executing normally) or to suspect run-time behaviour, where such malicious signatures are captured by a trusted entity, intentionally mimicking malicious software usage or intervention, in order to allow this to be later identified. Alternatively, where malicious behaviour is commonly only a small subset of the behaviour of executing software and the majority of the execution behaviour may be viewed as normal, the path signatures may correspond to previous run-time behaviour of software executing in a non-trusted environment (within the same execution session), which is captured and viewed as normal, and deviations from this behaviour can then be flagged as (potentially) abnormal. Thus these path signatures, which may further include attribute information defining their respective known behavioural classifications if they are based on previous execution in a controlled, trusted environment, then form a corpus of knowledge to be used for the future observation and behavioural classification of software execution. It will be recognised that these path signatures will be specific to the software being executed and may be specific to the platform on which that software is executed. It should be understood that the event data, of which a series is generated by the event capturing circuitry on the basis of monitoring the execution of software, represent snapshots of monitored quantities of relevance to the execution of the software, where these monitored quantities may be continually varying or may evolve in discrete steps. Some monitored quantities may be generated at discrete points in time, whereas others may be continually generated. In the present context an "event" is therefore characterised by being a snapshot of the monitored quantities at a time point selected by the event capturing circuitry, rather than being a particular occurrence in and of itself.

Furthermore, where the present techniques further recognise that it is not feasible to capture path signatures corresponding to all possible control flows which executing software might follow, or to capture path signatures corresponding to all possible malicious activity, or indeed that current execution behaviour may not precisely correspond to previously captured execution behaviour in an execution session (but does not then necessarily constitute an abnormal deviation), the present techniques disclose an approach according to which the path signatures are hashed to generate multiple hash tables and using which approximate nearest neighbour searching is carried out, allowing an observed path signature to be classified in dependence on hash collision-based similarity between the observed path signature and the content of the hash tables. Accordingly observed path signatures corresponding to software execution control flows which have not previously been observed can nevertheless be labelled with a behavioural classification, in particular as benign or malicious, on the basis of the "proximity" of the path signature to previously observed path signatures within the hash space onto which they are projected. This proximity may be determined in a variety of ways, but in some examples "locality sensitive hashing" (LSH) techniques are employed. There are a range of ways in which LSH may be implemented, though for clarity and brevity the present description is based on LSH with p-stable distributions.

The runtime hash table storage stores runtime approximate nearest neighbour searching hash tables and the hashing circuitry is configured to perform a query-and-conditional-insert process on the runtime approximate nearest neighbour searching hash tables in dependence on the observed path signature. Accordingly for each observed path signature the hashing circuitry both compares it against the current content of the hash tables and, dependent on a condition, may update the content of the hash tables to incorporate a representation of that observed path signature.

The condition may be variously defined and indeed in some circumstances the inserts may generally always be made. In other circumstances the condition may generally prevent updates from being made. More detail of example conditions is given below. These updates to the hashing tables may be variously configured, but in some embodiments the hash table storage comprises eviction circuitry, which is responsive to the query-and-conditional-insert process performed by the hashing circuitry, when the hash table storage is full, to evict least recently used entries of the hash table storage to allow insertion of entries for the observed path signature. This provides that the hash tables can be filled with content representative of observed path signatures and then further be maintained with content corresponding to most-recent behaviour.

In some embodiments the query-and-conditional-insert process inserting content corresponding to the observed path signature is conditional on the hash collision-based similarity determined with respect to the content of the runtime approximate nearest neighbour searching hash tables. For example, it may be configured that above a defined similarity the content corresponding to the observed path signature is not inserted, since similar behaviour has already been captured and the storage space can be left for the purpose of allowing a wider range of behaviour to be captured.

In some embodiments the query-and-conditional-insert process inserting content corresponding to the observed path signature is conditional on a relative fullness of the runtime approximate nearest neighbour searching hash tables. This relative fullness may control the conditional insertion is a variety of ways. For example when the runtime approximate nearest neighbour searching hash tables are relatively or completely full (such as once the system has been running for a while) it may be arranged for the insertions to only occur when other conditions are met, such as when the similarity metric is above or below a given threshold.

As discussed above the present techniques recognise that in a current execution session the behaviour of the software may usefully be compared not only against previous recent behaviour of the software is the same session, but also against behaviour of the software when it has been executed in a trusted environment. Thus in some embodiments the apparatus further comprises:

offline hash table storage to store offline approximate nearest neighbour searching hash tables, wherein the offline approximate nearest neighbour searching hash tables comprise entries provided by a trusted entity and wherein the entries correspond to at least one of:

path signatures generated when a known attack is carried out on the software;

path signatures generated when a known error occurs in the software; and path signatures generated when known false positive behavioural classification occurs; and path signatures generated when common benign behaviours occur, wherein the hashing circuitry is configured to query the offline approximate nearest neighbour searching hash tables with the observed path signature, and wherein the behaviour indication circuitry is configured to indicate the behavioural classification of the observed path signature in dependence on hash collision-based similarity between the observed path signature and content of the offline approximate nearest neighbour searching hash tables.

In some embodiments the query-and-conditional-insert process inserting content corresponding to the observed path signature is conditional on the hash collision-based similarity determined with respect to the content of the offline approximate nearest neighbour searching hash tables. For example where the query of the offline approximate nearest neighbour searching hash tables indicates that this is known attack or error behaviour, insertion into the runtime approximate nearest neighbour searching hash tables can be suppressed to avoid capturing this as "normal recent behaviour".

The entries in the offline hash table storage may comprise various additional information and in some embodiments the entries of the offline approximate nearest neighbour searching hash tables comprise attribute information defining behavioural classifications for the entries.

In some embodiments the insertion of content corresponding to the observed path signature into the runtime approximate nearest neighbour searching hash tables comprises storing attribute information associated with the entries. This attribute information may take a variety of forms. In some embodiments the attribute information associated with the entries comprises an indication of the hash collision-based similarity determined for the entries.

Whilst the corpus of knowledge of software behaviour which the offline approximate nearest neighbour searching hash tables represent may be wholly provided in advance of the software execution session which is being monitored, in some embodiments this is not the case. In such embodiments the apparatus further comprises:

update circuitry configured to add entries to the offline approximate nearest neighbour searching hash tables, wherein prior to a start of monitoring execution of the software the offline hash table storage comprises unused storage capacity, and wherein the update circuitry is responsive to new entries provided by a trusted entity during execution of the software to add the new entries to the offline approximate nearest neighbour searching hash tables.

Accordingly at system initialisation the offline approximate nearest neighbour searching hash tables may be provided partially full or indeed may be provided empty. Then, during the software execution session which is being monitored, the trusted entity may control updates to (further) populate the offline approximate nearest neighbour searching hash tables.

The event capturing circuitry may be provided with various configurations to capture the required event data in dependence on the execution of the software from which the observed path signature is generated. The event capturing circuitry may be configured to capture the event data over a predetermined time-window. The duration of the time windows in which the event capturing circuitry captures the series of event data is not limited and may be arbitrarily chosen according to the implementation of the present techniques. Nevertheless it may be chosen for these time windows to be relatively short, for example (in the context of contemporary data processor architectures) having a duration of 25 processor cycles, or may be defined in a time duration such as 25 microseconds. Alternatively, a window may be defined as a fixed number of events, for example, 25 events with associated time stamps. Accordingly it will be understood that behavioural classifications may be associated with path signatures generated over relatively short periods, and thus that a useful fine granularity of behavioural classification is supported, such that even a brief or transient malicious activity may be identified. Furthermore the time windows in which path signatures are captured may be defined in a variety of ways and those time windows may have any relationship with one another (e.g. distinct, overlapping, adjacent, regularly spaced, irregularly spaced and so on).

However according to some examples the apparatus further comprises:

a ping pong buffer comprising two event data buffers, wherein the two event data buffers are configured to alternately accumulate the series of event data, and wherein the path signature generation circuitry is responsive to a full buffer of the two buffers to generate the observed path signature dependent on the series of event data in the full buffer.

In embodiments in which both the offline approximate nearest neighbour searching hash tables and the runtime approximate nearest neighbour searching hash tables are present, the apparatus may be arranged to use their respective content in a variety of ways, to treat their respective content with a variety of respective priorities, and to maintain their respective content in a variety of ways.

In some embodiments the behaviour indication circuitry is configured to prioritise the hash collision-based similarity between the observed path signature and content of the offline approximate nearest neighbour searching hash tables, when the runtime approximate nearest neighbour searching hash tables are not full. Where the runtime approximate nearest neighbour searching hash tables are configured to be populated based on the execution behaviour in the current execution session, the greater the content of the runtime approximate nearest neighbour searching hash tables the more experience of the current execution they represent. Thus the content of the offline approximate nearest neighbour searching hash tables can be used to provide a basis for behavioural classifications of observed path signatures until sufficient content of the runtime approximate nearest neighbour searching hash tables has been built up to be deemed to be a useful representation of current behaviour. A threshold for this may be set as an implementation choice, but be set as when the runtime approximate nearest neighbour searching hash tables are full. This is also referred to herein as these hash tables being "hot".

In addition, various configurations of one or more similarity thresholds between the observed path signature and the content of the runtime and/or offline approximate nearest neighbour searching hash tables may be employed to further assist in the determination of the behavioural classifications of observed path signatures.

In some embodiments the behaviour indication circuitry is responsive, when the runtime approximate nearest neighbour searching hash tables are full, and when the hash collision-based similarity between the observed path signature and the content of the runtime approximate nearest neighbour searching hash tables is below a recognition threshold to cause the hashing circuitry to query the offline approximate nearest neighbour searching hash table with the observed path signature, and to transmit an indication of the observed path signature to the trusted entity. Thus it may be determined to be appropriate to notify the trusted entity if an observed path signature appears to be an unknown anomaly. Further processing of that observed path signature may then be carried out by the trusted entity, for example to further investigate the behaviour which generated this path signature and to update the offline approximate nearest neighbour searching hash tables together with an indication of the nature of that behaviour (i.e. benign and acceptable if observed again or malicious and to be appropriately responded to if observed again).

In some embodiments the behaviour indication circuitry is responsive, when the runtime approximate nearest neighbour searching hash tables are full, and when the hash collision-based similarity between the observed path signature and the content of the runtime approximate nearest neighbour searching hash tables is above a recognition threshold to indicate the behavioural classification of the observed path signature as benign.

The present techniques further recognise that on the one hand the greater the number of elements a path signature has the more precisely it may capture the particular behaviour it represents. However on the other hand the greater the number of elements a path signature has, the more complex the hashing comparison and the longer the hash look up times. In view of this, in some examples the hashing circuitry comprises:

band mapping circuitry to perform a banding process on the observed path signature to map a subset of elements of the observed path signature into a path band according to a predefined mapping, wherein the band mapping circuitry is configured to perform multiple versions of the banding process using multiple predefined mappings to generate multiple path bands, and wherein the hashing circuitry is configured to generate the runtime approximate nearest neighbour searching hash tables by applying a hashing function to the multiple path bands.

Accordingly the projection of a path signature into a path band, effectively taking a lower dimensional "slice" through the space inhabited by the greater dimensional path signature, and where multiple such path bands are generated, produces a reduced size representation of the path signature, which nevertheless (when multiple unrelated projections are used to generate the multiple path bands) provides a unique "fingerprint" for that path signature and accordingly for the behaviour it represents. The use of this reduced size representation thus reduces the size of the corresponding hash tables, reduces the complexity of the hashing comparison, and speeds up the hash look up times.

The hash collision-based similarity may be various determined. In some examples, the hashing circuitry is configured to determine the hash collision-based similarity in dependence on a collision count of hash collisions between the observed path signature and a multiplicity of the runtime approximate nearest neighbour searching hash tables. In some examples the hashing circuitry is configured to determine the hash collision-based similarity in dependence on a collision count of hash collisions between the observed path signature and a multiplicity of the offline approximate nearest neighbour searching hash tables. In some example the hash collision-based similarity is determined on the basis of an approximated Jaccard similarity (i.e. intersection/union), which may be calculated by the collision count divided by the number of hash tables. Appropriate threshold values are set against which this metric is compared.

In accordance with one example configuration there is provided a method of data processing comprising:

monitoring execution of software;

generating a series of event data in dependence on the execution of the software;

generating an observed path signature dependent on the series of event data;

storing runtime approximate nearest neighbour searching hash tables;

performing a query-and-conditional-insert process on the runtime approximate nearest neighbour searching hash tables in dependence on the observed path signature; and indicating a behavioural classification of the observed path signature in dependence on hash collision-based similarity between the observed path signature and content of the runtime approximate nearest neighbour searching hash tables.

In accordance with one example configuration there is provided a computer-readable storage medium storing in a non-transient fashion software which when executed on a computing device causes the computing device to carry out the steps of:

monitoring execution of software;

generating a series of event data in dependence on the execution of the software;

generating an observed path signature dependent on the series of event data;

storing runtime approximate nearest neighbour searching hash tables;

performing a query-and-conditional-insert process on the runtime approximate nearest neighbour searching hash tables in dependence on the observed path signature; and indicating a behavioural classification of the observed path signature in dependence on hash collision-based similarity between the observed path signature and content of the runtime approximate nearest neighbour searching hash tables.

Particular embodiments will now be described with reference to the figures.

FIG. 1A schematically illustrates apparatus 10 according to some example embodiments for monitoring software execution, generating path signatures, and performing a query-and-conditional-insert process on a set of hash tables. The apparatus 100 comprises monitoring capability to observe the execution of software 11 which in this example is provide by event capturing circuitry 12 which generates a series of event data representative of the behaviour of the software. Path signature generation circuitry 13 takes the series of event data captured and generates path signatures therefrom. Hashing circuitry 14 then performs a query-and-conditional-insert process on the multiple hash tables 15 on the basis of each path signature produced. On the basis of the outcome of the query, a behavioural indication is generated.

Figure 1B:
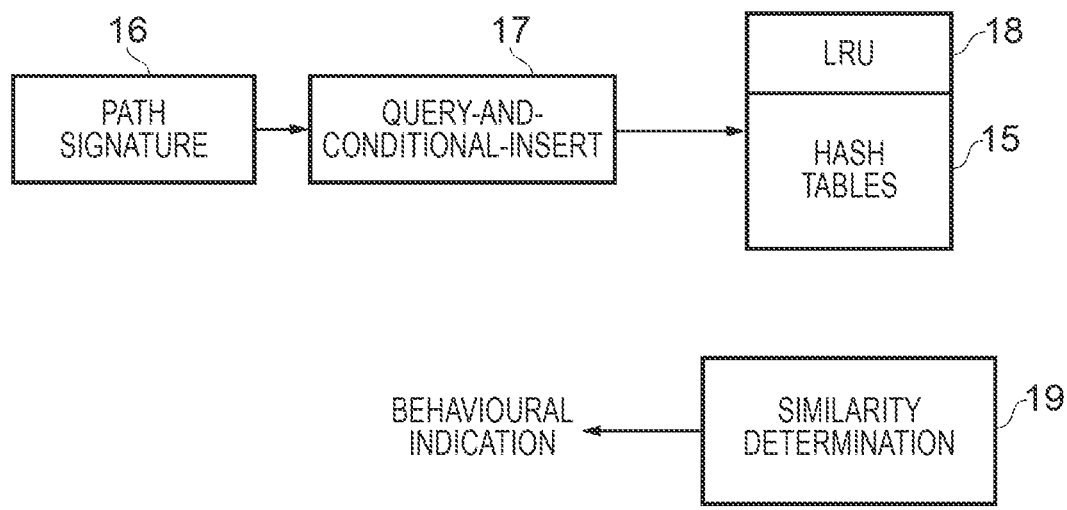
FIG. 1B schematically illustrates a variant of FIG. 1A according to some example embodiments in which the set of hash tables have least-recently-used eviction policy.

FIG. 1B schematically illustrates a variant of the apparatus 10 of FIG. 1A, wherein a path signature 16 generated on the basis of monitoring of software execution is subjected to the query-and-conditional-insert process 17 with respect to the multiple hash tables 15, where in this example the multiple hash tables 15 (or more strictly speaking their storage) is provided with least-recently-used capability, such that when the query-and-conditional-insert process is performed, and previous insertions (from the query-and-conditional-insert process) have filled the capacity of the hash tables storage, least recently entries are evicted to make room for the storage of new entries. One of ordinary skill in the art is familiar with such a replacement policy for cache structures and further description thereof is omitted merely for brevity.

Figure 2:
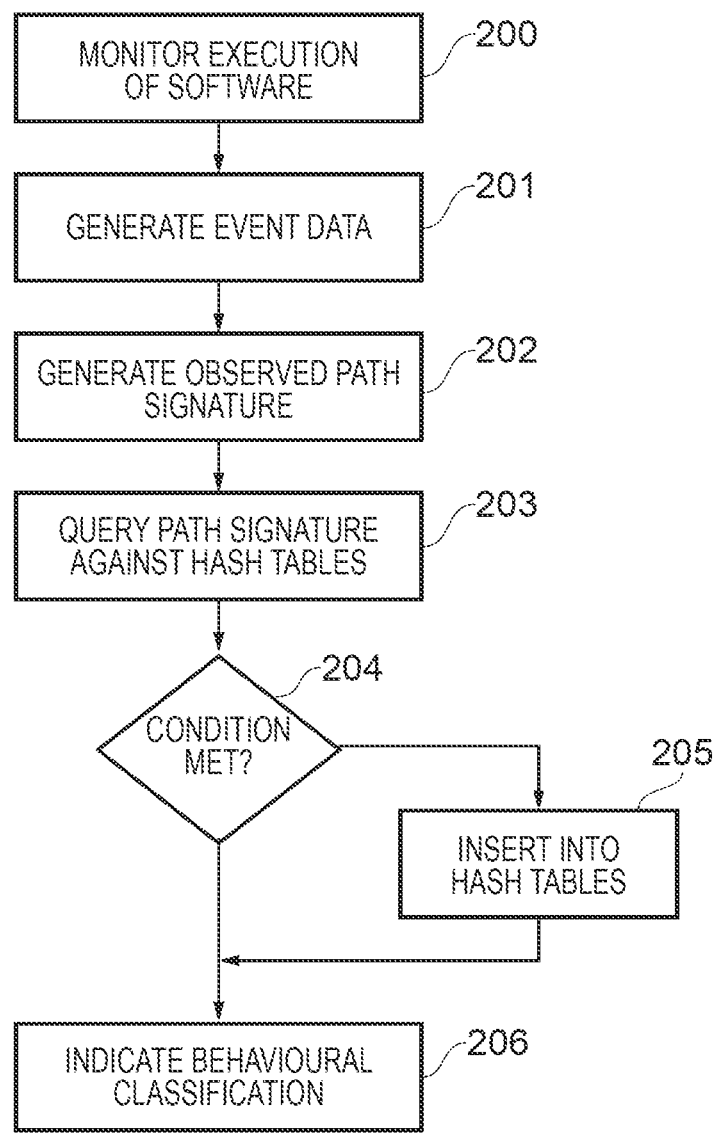
FIG. 2 is a flow diagram showing a sequence of steps which are taken according to the method of some example embodiments when monitoring the execution of software.

FIG. 2 is a flow diagram showing a sequence of steps which are taken according to the method of some example embodiments when monitoring the execution of software and classifying its behaviour. At step 200 the execution of the software is monitored and at step 201 event data characteristic of the behaviour of the software whilst executing is generated. On the basis of this event data, at step 202 a path signature is generated, and at step 203 a query of the path signature on approximate nearest neighbour searching hash tables is performed. At step 204 it is determined if one or more conditions are met. When the condition(s) is/are met at step 205 content is added to the hash tables for this path signature and the flow proceeds to step 206. When the condition(s) is/are not met at step 205 the flow proceeds directly to step 206, where on the basis of a hash collision-based similarity metric a behavioural classification is then indicated. These steps represent a high level description of the process by which approximate nearest neighbour (ANN) searching hash tables are populated and compared against. More detail of aspects of this process are described below with reference to the figures which follow.

Figure 3:
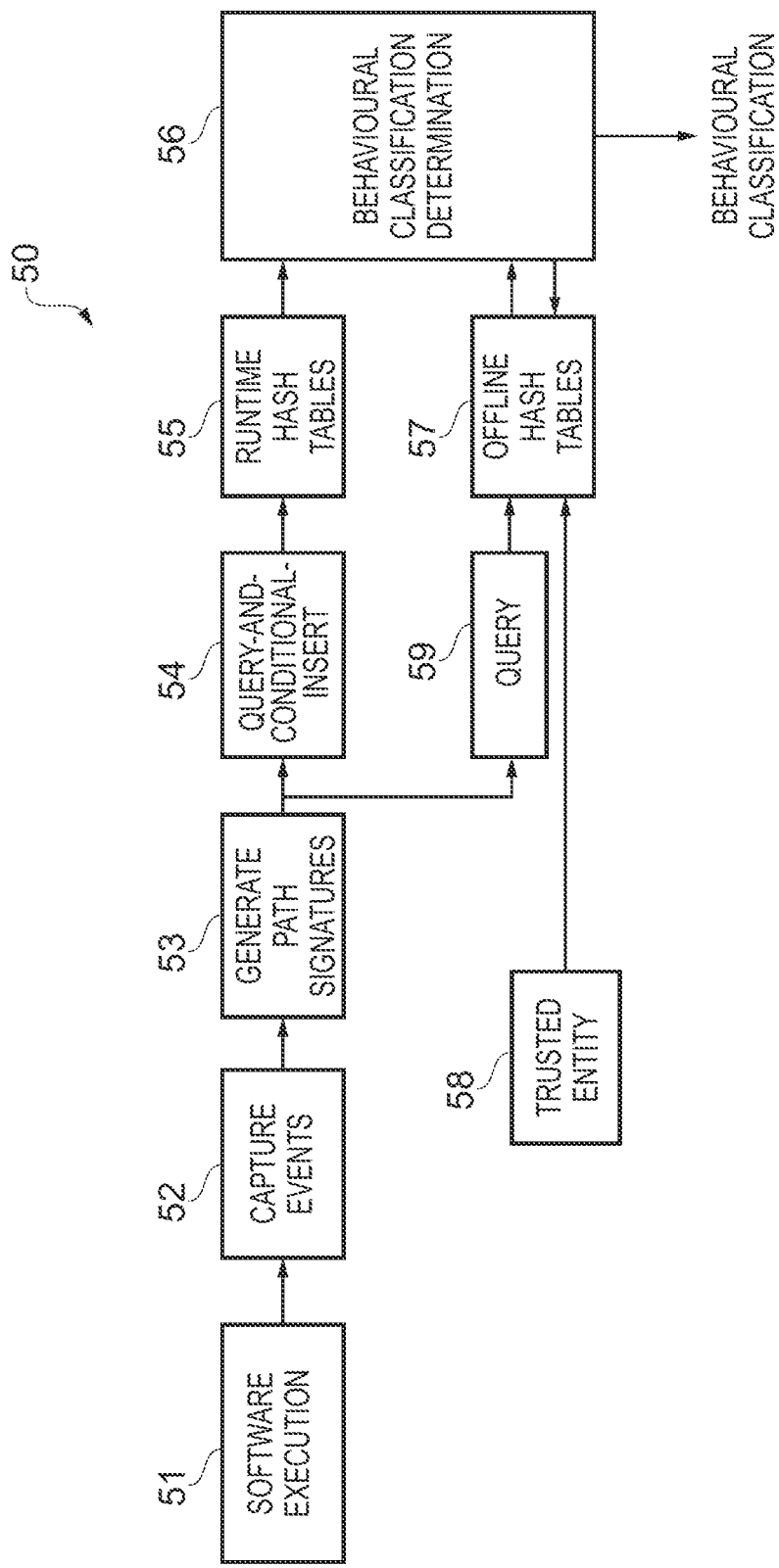
FIG. 3 schematically illustrates apparatus according to some example embodiments for monitoring software execution, generating path signatures, performing a query-and-conditional-insert process on a runtime set of hash tables, and querying an offline set of hash tables.

FIG. 3 schematically illustrates apparatus 50 according to some example embodiments for monitoring software execution, generating path signatures, performing a query-and-conditional-insert on a runtime set of hash tables, and querying an offline set of hash tables. The apparatus 50 comprises monitoring capability to observe the execution of software 51 which in this example is provide by event capturing circuitry 52 which generates a series of event data representative of the behaviour of the software. Path signature generation circuitry 53 takes the series of event data captured and generates path signatures therefrom. Hashing circuitry 54 then performs a query-and-conditional-insert on multiple runtime hash tables 55 on the basis of each path signature produced. On the basis of the outcome of the query, behavioural classification determination circuitry 56 generates a behavioural indication. Furthermore, the apparatus 50 also comprises multiple offline hash tables 57 the content of which is under the control of a trusted entity 58. For example the multiple offline hash tables 57 may be provided ready-populated by the trusted entity before monitoring of the software execution 51 begins. Alternatively or in addition new content of the multiple offline hash tables 57 may be provided by the trusted entity 58 as the monitoring of the software execution 51 is carried out. Thus when a path signature is generated by path signature generation circuitry 53 it can also be queried by hashing circuitry 59 against the content of the multiple offline hash tables 57. The behavioural classification determination circuitry 56 can thus generate the behavioural indication in dependence on the outcome of the queries against both the runtime hash tables and the offline hash tables. Furthermore, the behavioural classification determination circuitry 56 may also retrieve attribute data stored in association with the entries of the offline hash tables to further augment its determination of the behavioural indication. Where the content of the offline hash tables is generated under the control of a trusted entity when observing software execution, the trusted entity can store attribute data in association with the entries of the offline hash tables which is indicative of the nature of that software execution (e.g. when a known attack is carried out on the software, when a known error occurs in the software, when known false positive behavioural classification occurs, and so on).

Figure 4:
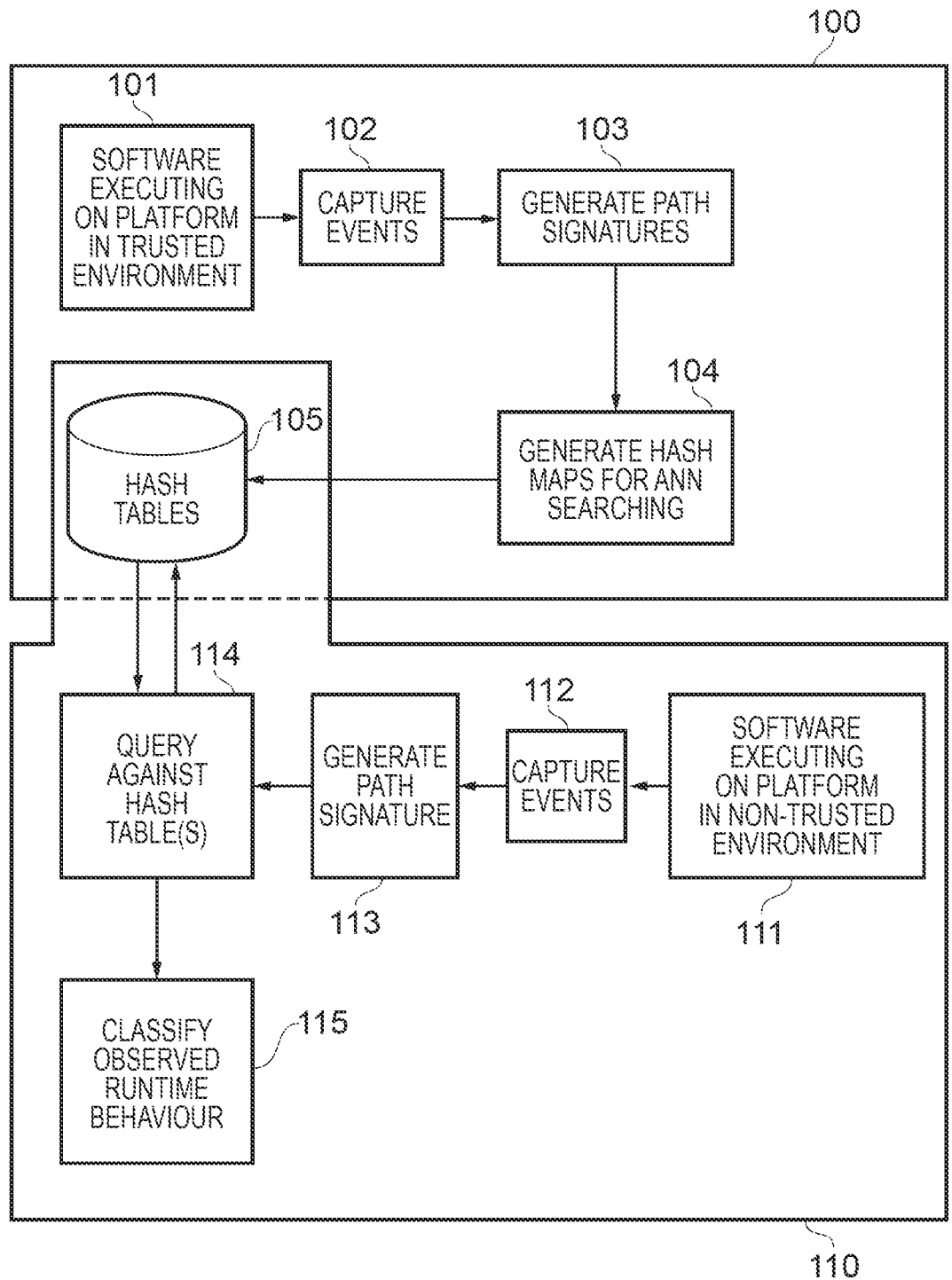
FIG. 4 schematically illustrates apparatus according to some example embodiments for firstly observing software executing in a trusted environment and apparatus for subsequently monitoring execution of that software in a non-trusted environment.

FIG. 4 schematically illustrates apparatus 100 according to some example embodiments for firstly observing software executing in a trusted environment and apparatus 110 for subsequently monitoring execution of that software in a non-trusted environment. The apparatus 100 is operated by a trusted entity in order to monitor the behaviour of a selected item of software and to generate path signatures and, from the path signatures, hash tables which capture a representation of the behaviour of the executing software. Accordingly the figure illustrates software 101 executing on a platform in this trusted environment. Event capturing circuitry 102 is provided which generates a series of event data representative of the behaviour of the software. Path signature generation circuitry 103 takes the series of event data captured and generates path signatures therefrom. Hashing circuitry 104 then generates content for multiple hash tables on the basis of each path signature produced, these multiple hash tables then being stored in hash table storage 105. These hash tables may thus be provided as the offline approximate nearest neighbour searching hash tables of the present techniques.

Apparatus 110 is not necessary operated by a trusted entity (although it may be) and generally for the understanding of the present techniques is considered to provide a non-trusted environment for the execution of software. FIG. 4 shows the same software 111 as was previously executed under the control of the apparatus 100 now executing in the non-trusted environment of the apparatus 110. The apparatus 110 is configured in a corresponding manner to the apparatus 100 in terms of its event capturing circuitry, its path signature generation circuitry, and for some aspects of its hashing circuitry. Accordingly path signatures are generated on the basis of the execution of the software 111 in a corresponding manner to the way that the path signatures were generated in the apparatus 100. Thus event capturing circuitry 112 generates a series of observed event data which is representative of the execution behaviour of the software 111. Path signature generation circuitry 113 takes the series of observed event data captured and generates an observed path signature therefrom. Hashing circuitry 114 then hashes the observed path signature and queries this against the content of the offline multiple hash tables 105, which were generated and populated by the apparatus 100. For the purpose of indicating the use by the apparatus 110 of the hash tables 105 generated by the apparatus 100, only one set of hash tables 105 is illustrated in FIG. 1. However it should be appreciated that in many implementations the hash tables 105 generated by the apparatus 100 will be copied and distributed in association with the software, such that apparatus 110 in fact will have its own copy of those hash tables. On the basis of the approximate nearest neighbour (ANN) searching carried out by the hash query circuitry 114 of the observed path signature against the content of the hash tables 105, a similarity between the observed path signature and those path signatures used to generate the content of the hash tables 105 is determined based on hash collisions, and this similarity metric can be used in the determination of the output of behavioural classification circuitry 115, which indicates the determined behavioural classification of the current execution of the software 111. Note that according to the present techniques the hashing circuitry 114 also queries the path signature against the content of runtime multiple hash tables (such as tables 15 in FIGS. 1A and 1B and tables 55 in FIG. 3), although this aspect is not explicitly illustrated in FIG. 4.

Figure 5:
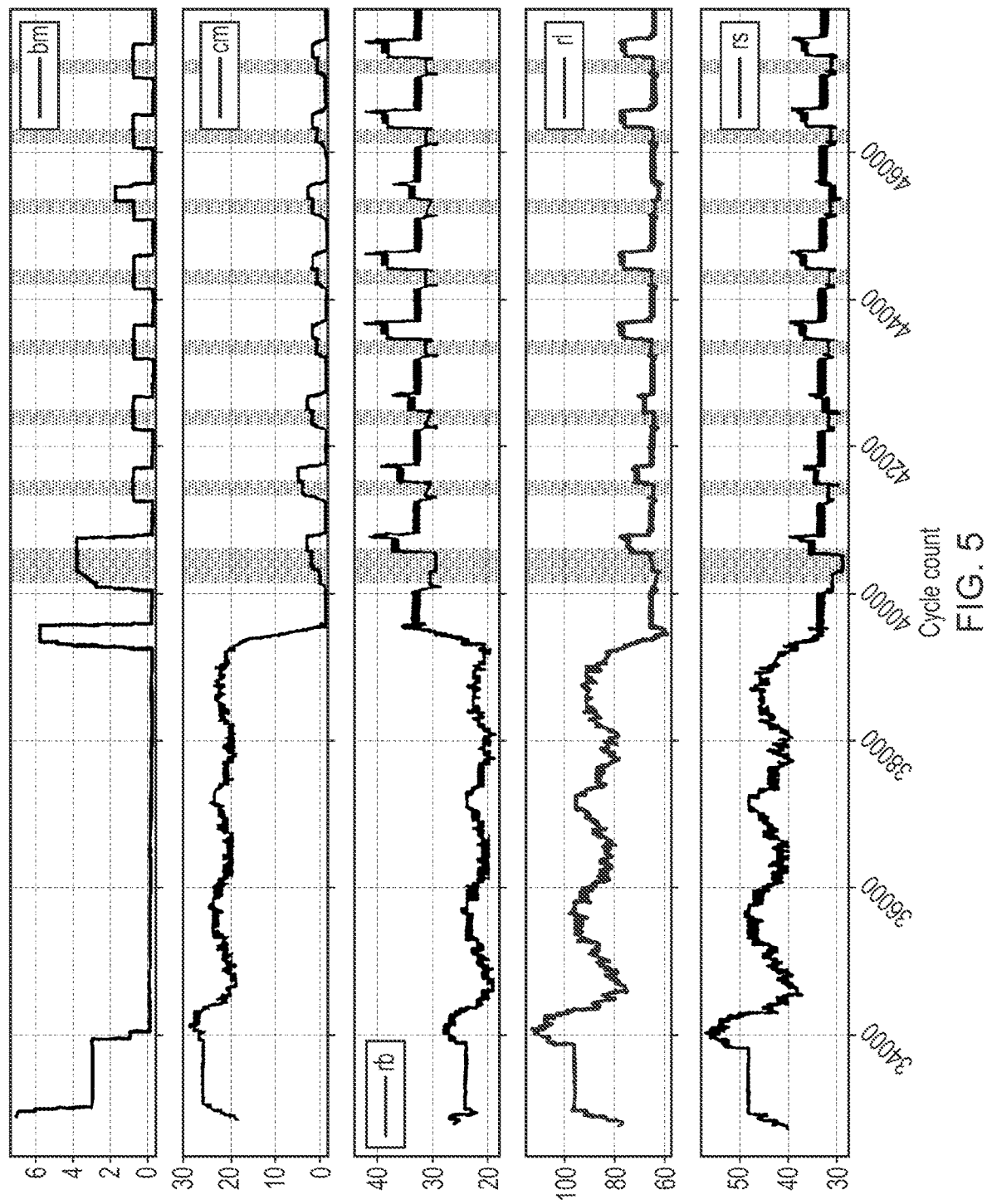
FIG. 5 shows the time evolution of an example set of monitored quantities when software is executing, from which series of event data may be derived and on the basis of which path signatures maybe generated according to some example embodiments.

FIG. 5 shows the time evolution of an example set of monitored quantities when software is executing, from which series of event data may be derived and on the basis of which path signatures may be generated according to some example embodiments. The respective event data variables (given the arbitrary labels: bm, cm, rb, rl, and rs) in the figure, may be captured by the event capturing circuitry in various ways. In the example illustrated these events (generated by a performance monitoring unit) are captured in a sliding time window. Event aggregators are used to aggregate over short, fixed time sample intervals (e.g. for the example illustrated over 25 cycles). When the software is executing in a test conducted by a trusted entity, it can be known a priori when particular behaviour is in progress (such as a known attack, intentionally performed by the trusted entity in order to capture representative path signatures) and purely by way of example the shaded bands in the figure represent such periods. When the software is executing in a test conducted by a trusted entity, for each test completed by the trusted entity a unique identifier in the test as well as a behavioural result code (e.g. "expected" or "assert") is stored in association with a classification label (e.g. "fault", "fail", "error handling", "pass") and a list of the path signatures generated.

Figure 6:
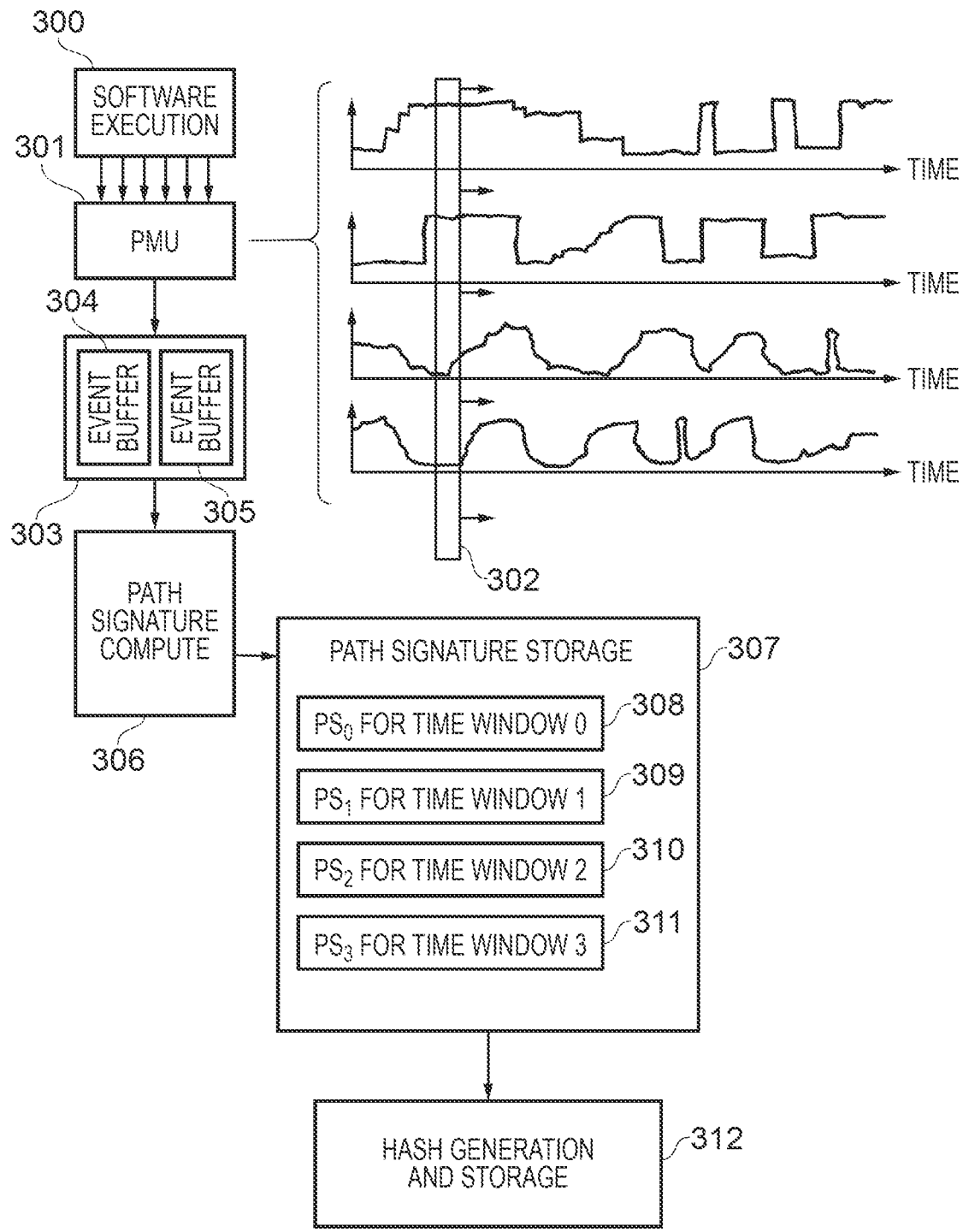
FIG. 6 schematically illustrates apparatus for monitoring the execution of software, for the generation of path signatures on the basis of events captured, and for populating hash tables on the basis of those path signatures according to some example embodiments.

FIG. 6 schematically illustrates components for monitoring the execution of software, for the generation of path signatures on the basis of events captured, and for populating hash tables on the basis of those path signatures according to some example embodiments. The executing software 300 is connected to a performance monitoring unit 301, within which a set of monitored quantities (such as those illustrated in FIG. 5) are tracked and a sliding time window 302 captures data indicative of these events. Captured values are buffered in an event buffer structure 303, which in the example of FIG. 6 is shown with twin buffers 304 and 305 in a ping-pong configuration, wherein event data are fed into one of these buffers until it is full, at which point this triggers its processing, and the path signature computation circuitry 306 extracts a path signature from the full buffer. In the meantime, event data are fed into the other buffer of the pair. The path signature competition circuitry 306 stores the path signatures into path signature storage 307, which is illustrated in FIG. 6 with example content of path signatures 308-311 each corresponding to a respective time window. From path signatures storage 307 the path signatures are then passed to the hash generation and storage circuitry 312, more detail of which will be discussed with reference to the figures which follow.

Figure 7:
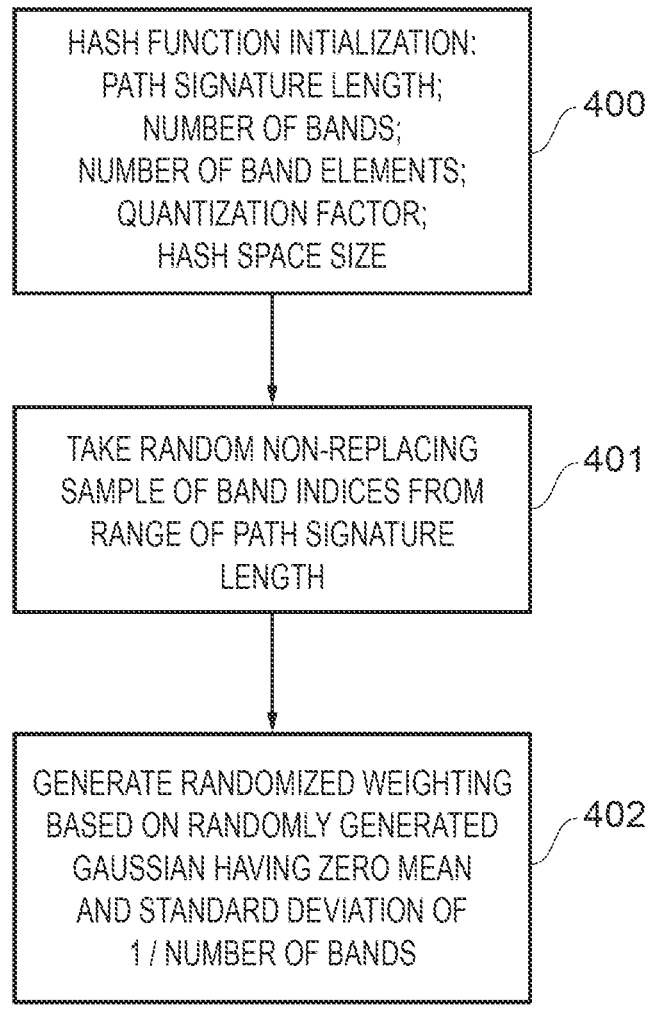
FIG. 7 shows a sequence of steps which are taken when initialising a hash function used in some example embodiments.

FIG. 7 is a flow diagram showing a sequence of steps which are taken when the apparatus generating the path signatures and hash table content on the basis of the software executing in the trusted environment is in an initialisation phase, in particular it shows the manner in which the hash function to be used is initialised. At the first step 400 of the initialisation, some parameters for the hash function are defined, these being the path signature length, the number of bands to be used, the number of elements within each band, a quantisation factor, and the hash space size. Then at step 401 the bands to be used are defined, where this process comprises taking a random, non-replacing sample of elements (multiplicity of which is given by the defined number of elements within each band) from the range of the path signature length. In other words a random subset of elements of the path signatures will then be used for each band. This random selection of elements is performed for each band. Then at step 402 a randomised weighting to be used in the hash function is generated based on a randomly generated Gaussian having zero mean and a standard deviation given by the inverse of the number of bands.

Figure 8A:
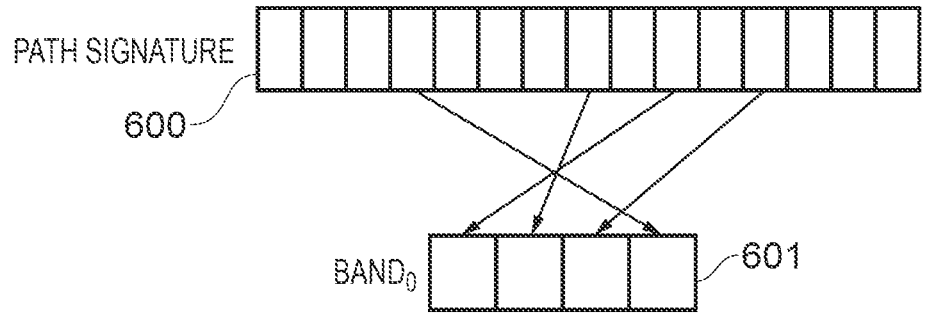
FIG. 8A schematically illustrates the randomised mapping of path signature elements into a selected band to be used in association with a particular hash table according to some example embodiments.
Figure 8B:
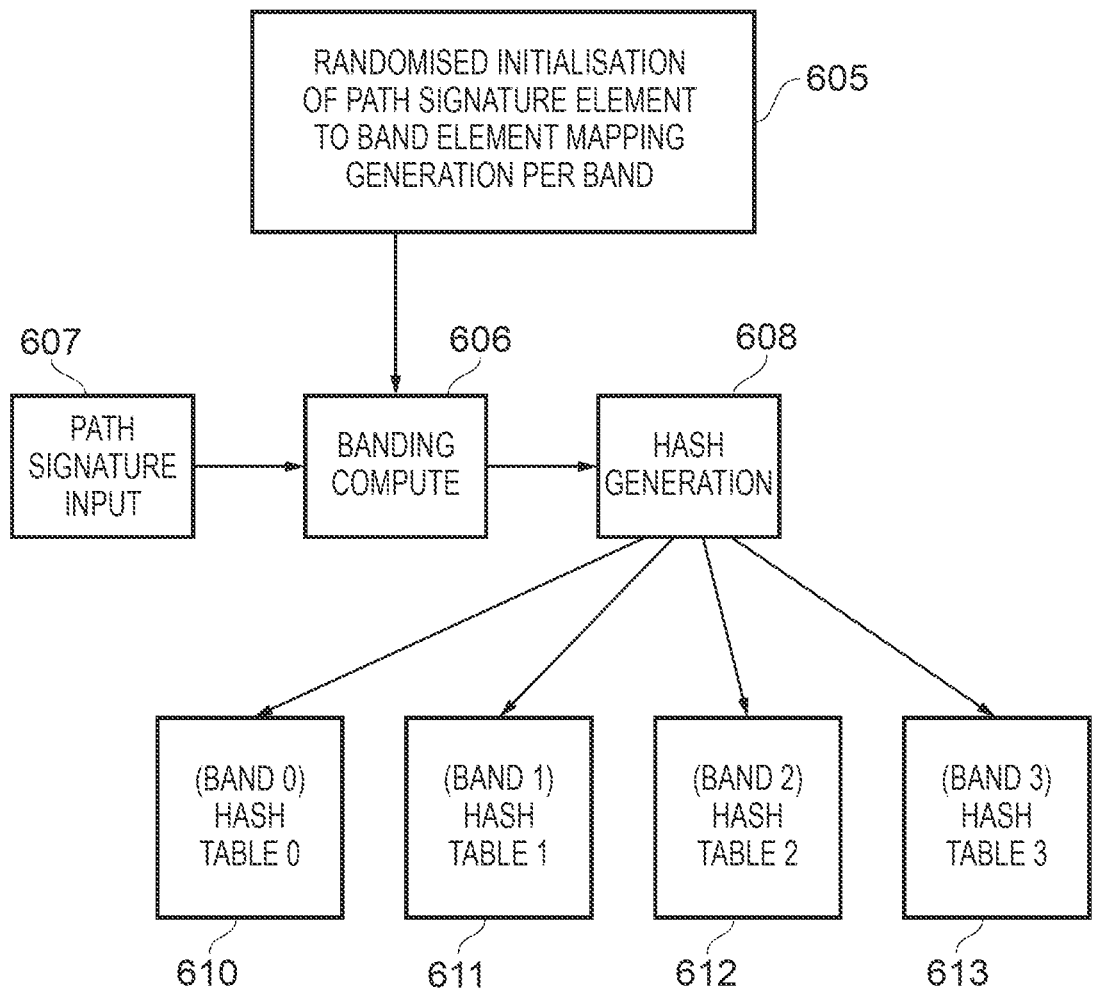
FIG. 8B schematically illustrates the manner in which hash tables are populated on the basis of path signature input and band definitions according to some example embodiments.

FIG. 8A schematically illustrates the randomised mapping of path signature elements into a selected band to be used in association with a particular hash table according to some example embodiments. As can be seen in the figure the path signature 600 comprises more elements than the band generated therefrom. The choice of the subset of the elements of the path signature which forms the band may be performed in various ways, but in an example embodiment the element indices for the band idx are generated by a randomised non-replacing selection from the available element indices of the path signature. The same selection process is used to select the path signature elements to be used in each of the bands (where the number of bands to be used is also an initialisation parameter).

FIG. 6B schematically illustrates the manner in which hash tables are populated on the basis of path signature input and band definitions according to some example embodiments. Randomised initialisation of the mapping of path signature elements to band elements is performed at 605, setting up element mappings are per band. These element mappings provide one input to a banding compute step 606 into which the other input is the path signature to be processed 607. The banding compute step 606 determines the band "slices" of the path signature which are to be used for the hashing process. Thus calculated these bands are passed to the hash generation stage 608, which then applies a hash function to them in order to generate content of the respective hash tables. In the example of FIG. 6B a set of four hash tables 610-613 are shown, but this is merely for clarity of illustration and the present techniques are not limited to a particular number of hash tables. Note that (as labelled in the figure) there is one to one correspondence between the defined bands and the hash tables. It should be recognised here that various hashing schemes might be employed for the purpose of the populating the approximate nearest neighbour tables and searching them. Here for simplicity of description a locality sensitive hashing scheme with p-stable distributions is presented. These are universal hashes with a multiplier, w, sampled independently and identically distributed (IID) from a Gaussian distribution, using a positive hash divisor (quantisation factor), r, where the hash function applied to band idx of a path signature of depth D, $Sig_D(x)$, and with band count B in hash table depth P may be given by:

$$h(Sig_D(x)) = \left\lfloor \frac{w^T \cdot Sig_D(x)[band_{idx}]}{r} \right\rfloor \% P$$

where:

$$w \sim N\left(0, \frac{1}{B}\right) \Big| w \in \mathbb{R}^B$$

Note that x strictly speaking is a tensor in the hashing function, but due to the structure of the path signature tensors the linear array representation may be treated as an unravelled vector in $\mathbb{R}^n$. Optionally an offset b in [0,r] may be applied, i.e. such that the hash function is then given by:

$$h(Sig_D(x)) = \left\lfloor \frac{w^T \cdot Sig_D(x)[band_{idx}] + b}{r} \right\rfloor \% P$$

Accordingly, each band has its own hash function and target hash table. Note that hash collisions are an integral feature of the locality sensitive hashing implementation, i.e. that in this context (where appropriate) hash collisions are explicitly wanted (since these represent matches between observed path signatures and a previously generated path signature in a given test). Further, inserts into the hash tables append (idx, test_id) to a linked list in the appropriate hash bucket, where test_id is a unique test identifier. For each path signature (s, idx, test_id, label), where s is the path signature identifier and label is a classification label (e.g. "fault", "fail", "error handling", "pass"), for each band i in s, the insert thus comprises: $h_i(s[i])$.append((idx, test_id)). Note that by storing test_id in the hash tables this supports the ability to query the hash tables and determine if a particular behaviour is, for example, in a known fail/fault state, which can be useful in a variety of dynamic malware monitoring contexts. At the conclusion of the process of generating the hash tables content, each hash table (hash map) produced is stored. This may for example comprise serialising each hash map and writing to an output file, in association with the banding pattern, the event capturing configuration data (PMU configuration, etc), and sliding time window metadata. The use of the band "slices" from the path signatures reduces the size and dimensionality of the data being processed and look-up times in the thus-generated hash tables are correspondingly reduced. Here lookup times are O(b.n+ E[len(collision_ll)]), where b is the number of bands, n is the number of elements of each band, and E is the expected length of the collision linked list. Note that the expected length of the collision linked list, which is can be tuned in (and predicted at) the hash table generation process described above.

Figure 9:
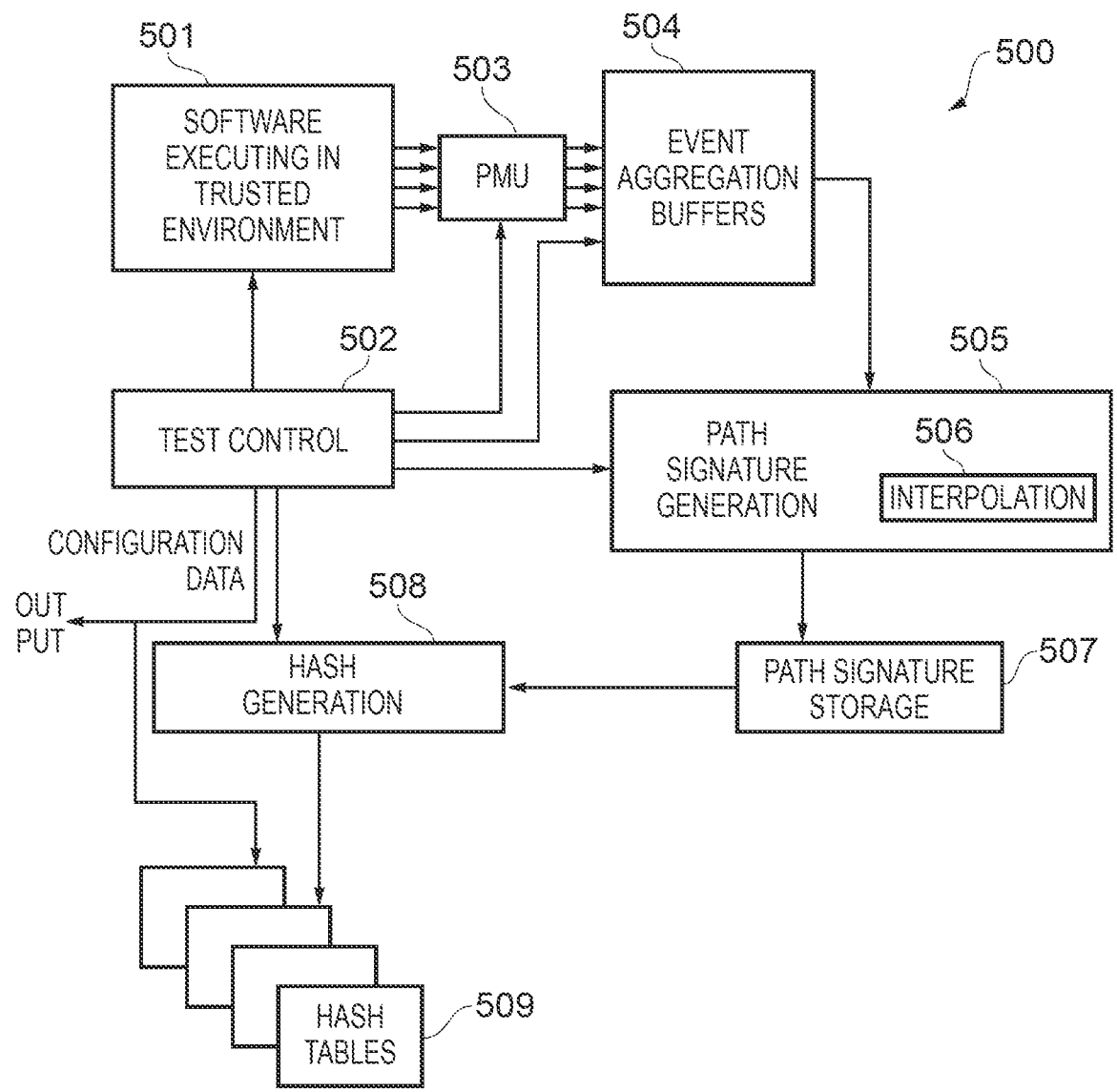
FIG. 9 schematically illustrates apparatus according to some example embodiments for monitoring the execution of software in a trusted environment and generating hash table content on the basis of the trusted execution.

FIG. 9 schematically illustrates apparatus 500 according to some example embodiments for monitoring the execution of software in a trusted environment and generating offline hash table content on the basis of the trusted execution. Where apparatus 500 is a trusted entity, it is operated under control of a user seeking to characterise the behaviour signatures of software 501 executing in this trusted environment. In with order to capture many useful behavioural signatures the apparatus is provided with test control circuitry 502, which has control over the data and control inputs to the software 501, such that it can cause a range of tests to be carried out which not only characterise normal behaviour of the software which is frequently observed, but also corner cases of control flow and data input in response to which the software may exhibit unusual, but nonetheless benign behavioural patterns. In essence as long as the hash tables have the capacity to store entries representative of the software behaviour, the more permutations of configuration in which the software is operated in this test environment the better its behaviour when executed in a non-trusted environment can be correctly classified. The test control circuitry 502 also configures the setup of the performance monitoring unit 503, the event aggregation buffers 504, the path signature generation circuitry 505, and the hash generation circuitry 508. Configuration data indicative of the configurations of these components may be separately output or may be stored in association with the hash tables 509. Accordingly when the hash tables 509 are provided in association with this configuration data, the recipient system can configure its event capturing, path signature generation, and hashing circuitry in a corresponding manner to allow observed path signatures to be captured and compared against the content of the hash tables 509 in a meaningful manner. The path signature generation circuitry 505 comprises interpolation circuitry 506, such that for each recorded time window of PMU events, missing entries can be inserted to allow the path signature generation to be based on equi-sampled events. Path signatures generated by the path generation circuitry 505 stored in the past signature storage 507, from where they are taken to be subjected to the defined hashing function (see the description of FIG. 7 above concerning the initialisation of this hashing function), and the results are stored in the hash tables 509.

Figure 10:
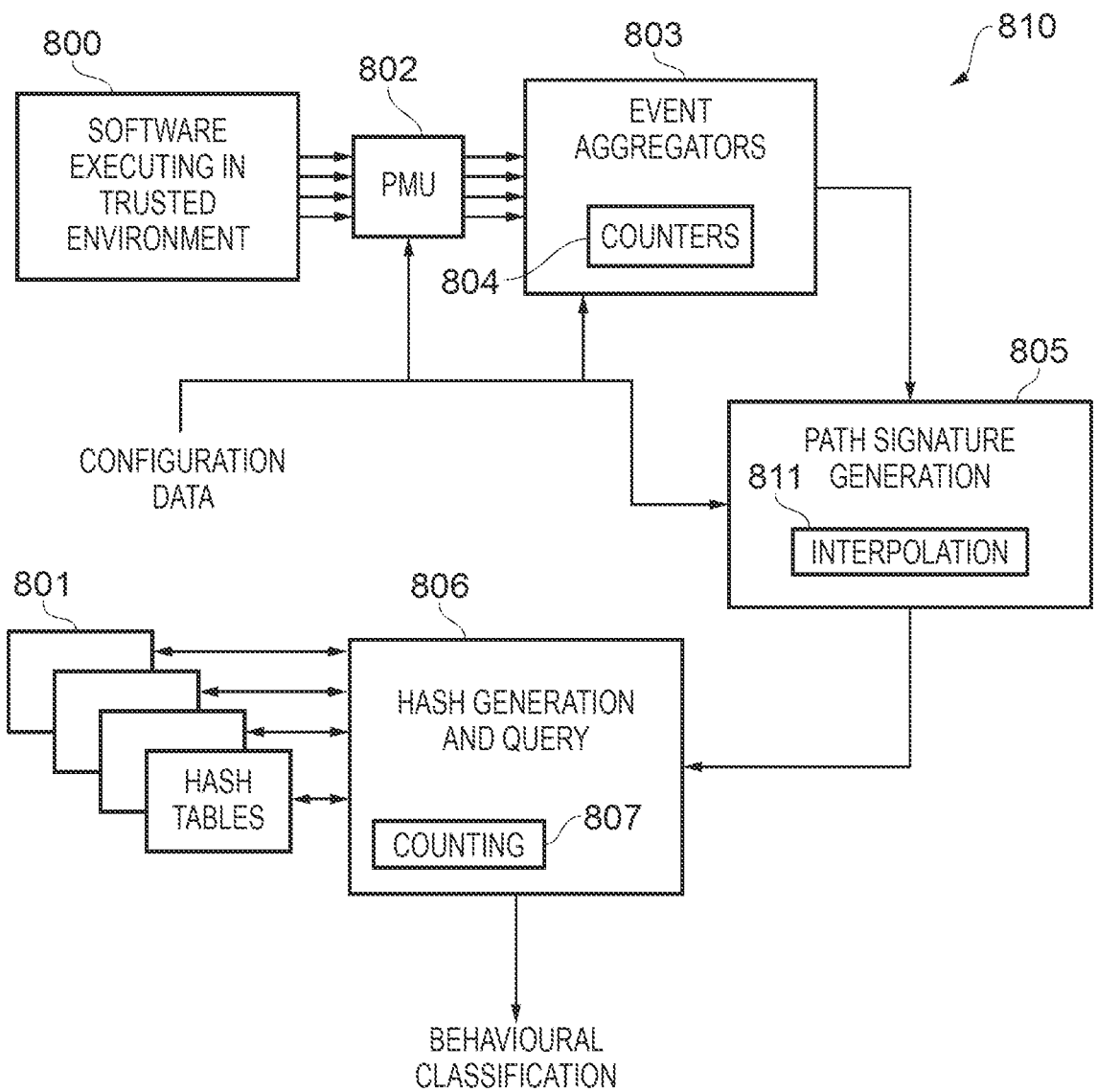
FIG. 10 schematically illustrates apparatus according to some example embodiments for monitoring the execution of software in a non-trusted environment and comparing an observed path signature against hash table content previously generated on the basis of the trusted execution.

FIG. 10 schematically illustrates apparatus 810 according to some example embodiments for monitoring the execution of software in a non-trusted environment and comparing an observed path signature against offline hash table content previously generated on the basis of the trusted execution. Accordingly apparatus 800 is a non-trusted entity and is operated under control of an end user. The apparatus 810 is configured to monitor the execution of the software 800 executing in this non-trusted environment, such that the behaviour of the software can be classified and, if appropriate, remedial or defensive action can be taken. The offline hash tables 801 may also be provided with the configuration data defining the process by which they were generated (PMU settings, sliding window parameters etc.) and this configuration data is used in the apparatus 810 to configure the setup of the performance monitoring unit 802, the event aggregators 803, counters 804 associated with the event aggregators, the path signature generation circuitry 805, and the hash generation and query circuitry 806. Thus the apparatus 810 can configure its event capturing, path signature generation, and hashing circuitry in a corresponding manner to allow observed path signatures to be captured and compared against the content of the hash tables 801 in a meaningful manner. As in the case of the path signature generation circuitry 505 of FIG. 9, the path signature generation circuitry 805 comprises interpolation circuitry 811, such that for each recorded time window of PMU events, if required, missing entries can be inserted to allow the path signature generation to be based on equi-sampled events. An observed path signature generated by the path generation circuitry 805 is passed to the hash generation and query circuitry 806, which applies the defined hashing function, where this is also configured by the initialisation process described above with reference to FIG. 7, and where configuration parameters for the hash generation and query circuitry 806 are also provided in associated with the provided hash tables. The hash generation and query circuitry 806 queries each band's hash table for hash collisions. On the basis of the hash collisions observed, a behavioural classification is generated. Counting circuitry 807 is provided to support this determination. In this example the hash collision-based similarity is determined on the basis of a Jaccard similarity (i.e. intersection/union), which here is approximated by calculating the collision count divided by the number of hash tables. Appropriate threshold values are set against which this metric is compared. For example the behavioural classification can be determined as a positive identification when the metric exceeds a confidence threshold. Equally, below this (or below a separate threshold) the behavioural classification can be determined as a non-identification. Where the hash tables in this example are generated on the basis of multiple tests (which have aimed to provide a wide code coverage), the counting circuitry 807 can be employed to determine test_id duplications in the results, whereby when multiple hash collisions are determined across the bands (i.e. hash tables) for a given test_id, the greater confidence can be associated with the behavioural identification associated with a that test. In another style of identification example, the behavioural classification may be determined on the basis of multiple hash collisions corresponding to different tests, but where those tests correspond to a particular behaviour type (i.e. benign or malicious). Hence when hash collisions are found which predominately correspond to malicious behaviour example tests, this increases the confidence that the appropriate behavioural classification for the observed path signature is one of malicious behaviour.

Figure 11:
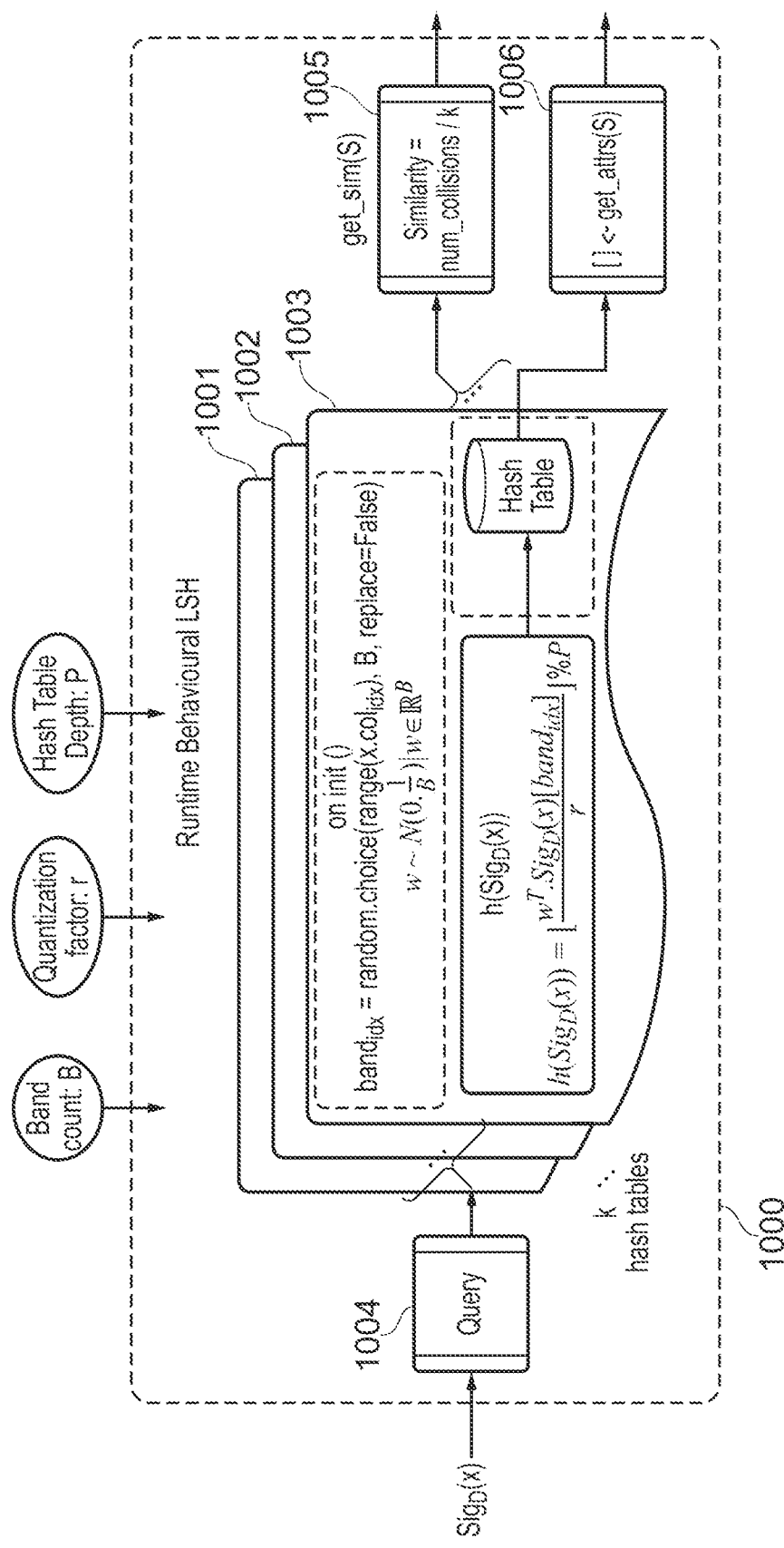
FIG. 11 schematically illustrates hash query circuitry and hash table storage comprising multiple hash tables in accordance with some example embodiments.

FIG. 11 schematically illustrates hash query circuitry 1000, comprising hash table storage comprising multiple offline hash tables 1001, 1002, 1003 in accordance with some example embodiments. The hash tables and hash function are configured by the provided initialisation parameters: band count B, quantization factor r, hash table depth P. As described in more detail above the respective bands bandi& are initialised as a random subset choice of elements from the path signature structure, and a weighting w is sampled from a Gaussian distribution. A query function 1004 then queries the observed path signature SigD(x) against the k hash tables 1001-1003 provided. Only three hash tables are shown here merely for clarity of illustration. The resulting hash collisions are used by the similarity function 1005 (as the ratio of the number of collisions to the number of hash tables k) to determine the similarity of the observed path signature SigD(x) to the trusted test environment path signatures which were used to generate the content of the offline hash tables. A further look-up function get_attrs 1006 can extract the attributes stored in association with any entries in the hash tables (giving information about the tests in the trusted environment which generated this content).

Figure 12:
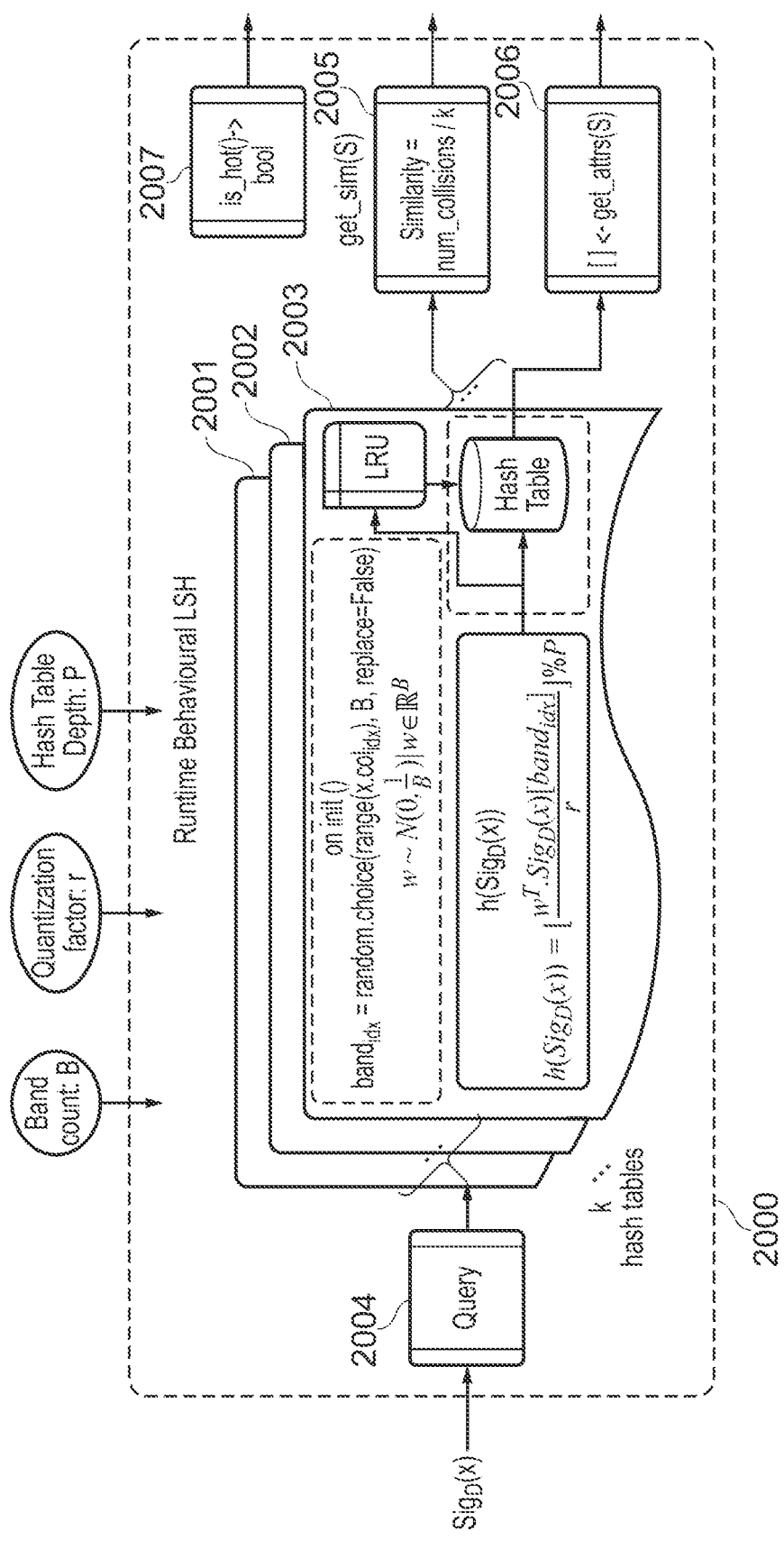
FIG. 12 schematically illustrates hash query-and-conditional-insert circuitry and hash table storage comprising multiple hash tables in accordance with some example embodiments.

FIG. 12 schematically illustrates hash query-and-conditional-insert circuitry 2000, which is closely related hash query circuitry 1000 of FIG. 11. The difference is that whilst the hash query circuitry 1000 of FIG. 11 is provided to store and query multiple offline hash tables, the hash query-and-conditional-insert circuitry 2000 of FIG. 12 is provided to store and perform a query-and-conditional-insert on multiple runtime hash tables. Thus the components of each are closely related and indeed in many implementations may be shared or, alternatively put, a single instance of hash circuitry may be provided which has the performs the functions described for each of FIGS. 11 and 12. Nevertheless the content of the multiple offline hash tables and the multiple runtime hash tables are then still kept distinct from one another. Thus hash query-and-conditional-insert circuitry 2000 comprises hash table storage comprising multiple runtime hash tables 2001, 2002, 2003 in accordance with some example embodiments. The hash tables and hash function are configured by the provided initialisation parameters: band count B, quantization factor r, hash table depth P. As described in more detail above the respective bands $band_{idx}$ are initialised as a random subset choice of elements from the path signature structure, and a weighting w is sampled from a Gaussian distribution. An query-and-conditional-insert function 2004 then queries the observed path signature SigD(x) against the k hash tables 2001-2003 provided. Only three hash tables are shown here merely for clarity of illustration. LRU functionality is provided in association with the storage of the hash tables 2001-2003, such that when an insert is to be performed and the tables are full, a least-recently-used eviction is performed to provide the storage location of the new content. The resulting hash collisions (or lack thereof) are used by the similarity function 2005 (as the ratio of the number of collisions to the number of hash tables k) to determine the similarity of the observed path signature SigD(x) to the runtime path signatures which were used to generate the content of the runtime hash tables. A further look-up function get_attrs 2006 can extract any attributes stored in association with any entries in the hash tables (giving further context of their generation if available). Another function is_hot 2007 provides a boolean value indicative of whether the runtime hash tables are sufficiently full ("hot") or not. The query-and-conditional-insert function 2004 can be configured to make the insertion dependent on one or more conditions. For example, the hash collision-based similarity resulting from the query may be used. In one configuration if the similarity is above a defined similarity the content corresponding to the observed path signature is not inserted, since similar behaviour has already been captured and the storage space can be left for the purpose of allowing a wider range of behaviour to be captured. The condition can comprise a relative fullness of the runtime approximate nearest neighbour searching hash tables, such as is given by the function is_hot 2007. For example when the hash tables are relatively or completely full (such as once the system has been running for a while) a configuration can be adopted in which the insertions only occur when other conditions are met, such as when the similarity metric is above or below a given threshold. As is described below with reference to FIG. 13, an observed path signature may also be compared against content of offline approximate nearest neighbour searching hash tables. The query-and-conditional-insert function 2004 may then make the insertion conditional on the outcome of that query of the offline approximate nearest neighbour searching hash tables. For example when this indicates that this is known attack or error behaviour, insertion into the runtime approximate nearest neighbour searching hash tables can be suppressed to avoid capturing this as "normal recent behaviour". The query-and-conditional-insert function 2004 can also be configured such that the insertion is conditional on attribute information associated with the entries, such as is retrieved by the look-up function get_attrs 2006. This attribute information may comprise an indication of the hash collision-based similarity determined for the entries.

Figure 13:
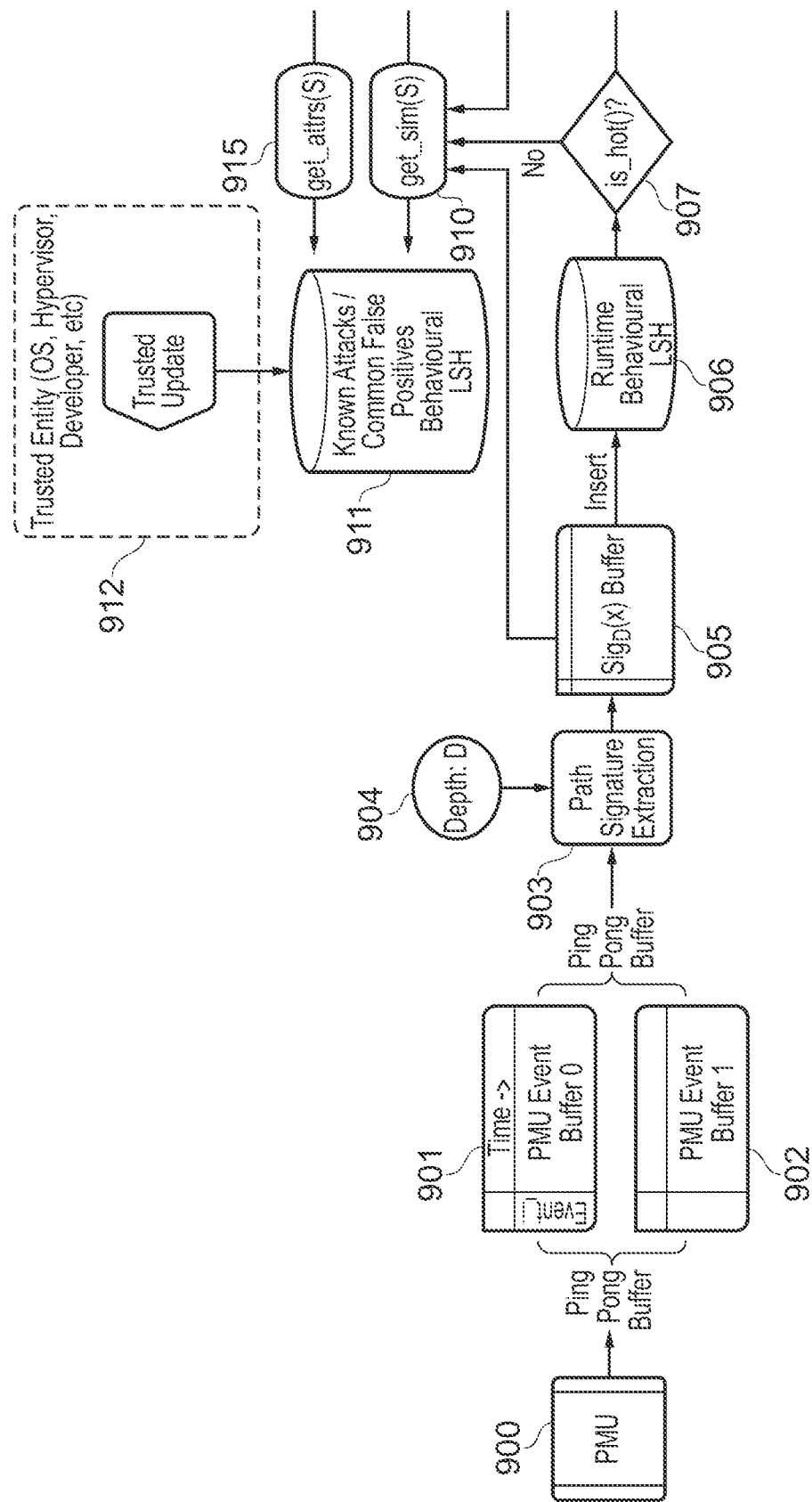
FIG. 13 schematically illustrates apparatus in accordance with some example embodiments comprising hash query circuitry and runtime hash table storage, hash query-and-conditional-insert circuitry and hash table storage comprising multiple hash tables, and steps taken in the use of these components.
Figure 13:
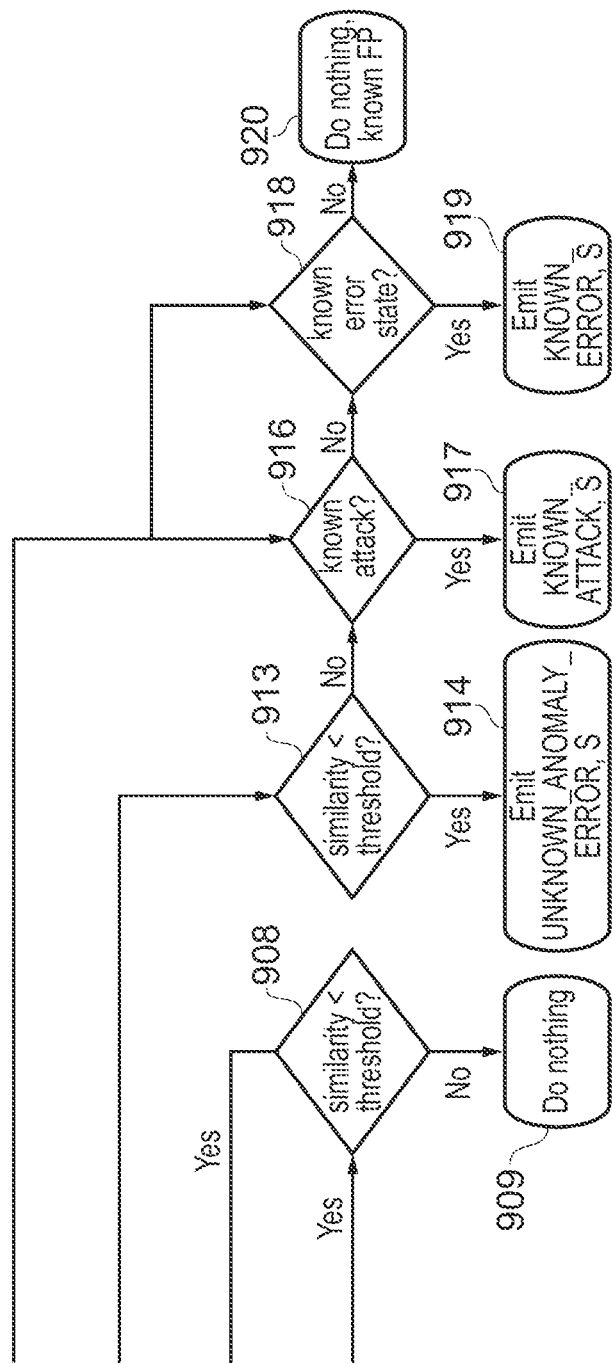

FIG. 13 schematically illustrates apparatus in accordance with some example embodiments comprising hash query circuitry and runtime hash table storage, hash query-and-conditional-insert circuitry and hash table storage comprising multiple hash tables, and steps taken in the use of these components. In some examples all illustrated components may be provided within one unitary apparatus, however more generally this need not be the case. A performance monitoring unit (PMU) 900 is provided which monitors the execution of software and captures event data representative of the execution. The data are stored in a ping-pong buffer comprising PMU event buffer 901 and PMU event buffer 902. The storage of event data alternates between these two events buffers, filling one to capacity and then beginning filling the other. When one of the PMU event buffers 901, 902 reaches full capacity, its content is used by path signature extraction circuitry 903 to generate a corresponding path signature. Path signature extraction circuitry 903 is configured by the input 904 of a depth parameter D to generate all path signatures with this predefined length. A path signature is then buffered in the path signature buffer 905, from where it is subjected to the query-and-conditional-insert process with respect to the content of the run-time hash tables 906. The boolean value is_hot is checked 907 and when this indicates that the content of the run-time hash tables 906 are "hot", a determination 908 is made as to whether the similarity metric generated as a result of querying the run-time hash tables is below a threshold. If it is not then this indicates that the path signature correspond sufficiently well to those previously generated and used to populate the run-time hash tables 906. In other words this path signature does not represent a significant deviation from the recent behaviour of the software and this is concluded to be acceptable here and nothing further is done (909) for this run-time comparison. However the path signature is also taken from the path signature buffer 905 and compared against the content of the off-line hash tables 911, the content of which has been provided by the trusted entity 912, where this may take various forms, such as a trusted operating system, a trusted hypervisor, a trusted system developer, and so on. The content of the off-line hash tables is representative of known behaviour patterns, which it is beneficial to identify. For example these may be known malicious behaviour, known attacks, as well as known false positive behaviours and common known benign behaviours. Thus a similarity determination 910 is also performed for the observed path signature against the content of the off-line hash tables 911. In the event that the run-time hash tables are hot and the similarity determination 908 with respect to the run-time hash tables is below a threshold, then when the similarity determination 910 with respect to the off-line hash tables is also below a threshold (not necessarily the same threshold as that used for the run-time hash tables) then the behaviour has not been seen before and an anomaly indication 914 can be generated. Furthermore, where the content of the off line hash tables 911 is provided by the trusted entity 912, entries in the off-line hash tables 911 can be provided with further attribute data indicative of the nature of the corresponding behaviour. When the path signature is compared against the content of the off-line hash tables 911 and attribute retrieval 915 is also performed. Thus when the similarity determination 913 against the content of the off-line hash tables 911 is performed, and is found to be above the given threshold, then a further determination 916 with respect to the attribute data is performed to categorise this known behaviour. For example if it is known attack behaviour then a corresponding behavioural classification 917 can be generated. Alternatively, if a known error state determination 918 indicates that this is a known error state a corresponding behavioural classification 919 can be generated. Finally, when the match against the content of the off-line hash tables is found to be neither a known attack nor a known error state, then it may be classified as a false positive and a corresponding behavioural classification 920 may result (and this may or may not be explicitly notified). Note that, for clarity of explanation of the look-up processes and the actions taken in dependence on the results, the retrieval of content from the hash tables and judgements made on the basis of that content are in part shown as functional steps in FIG. 13. One of ordinary skill in the art will immediately recognise that the querying circuitry which performs the look-ups and/or the above described circuitry to generating a behavioural classification may readily embody and implement these functions.

Figure 14:
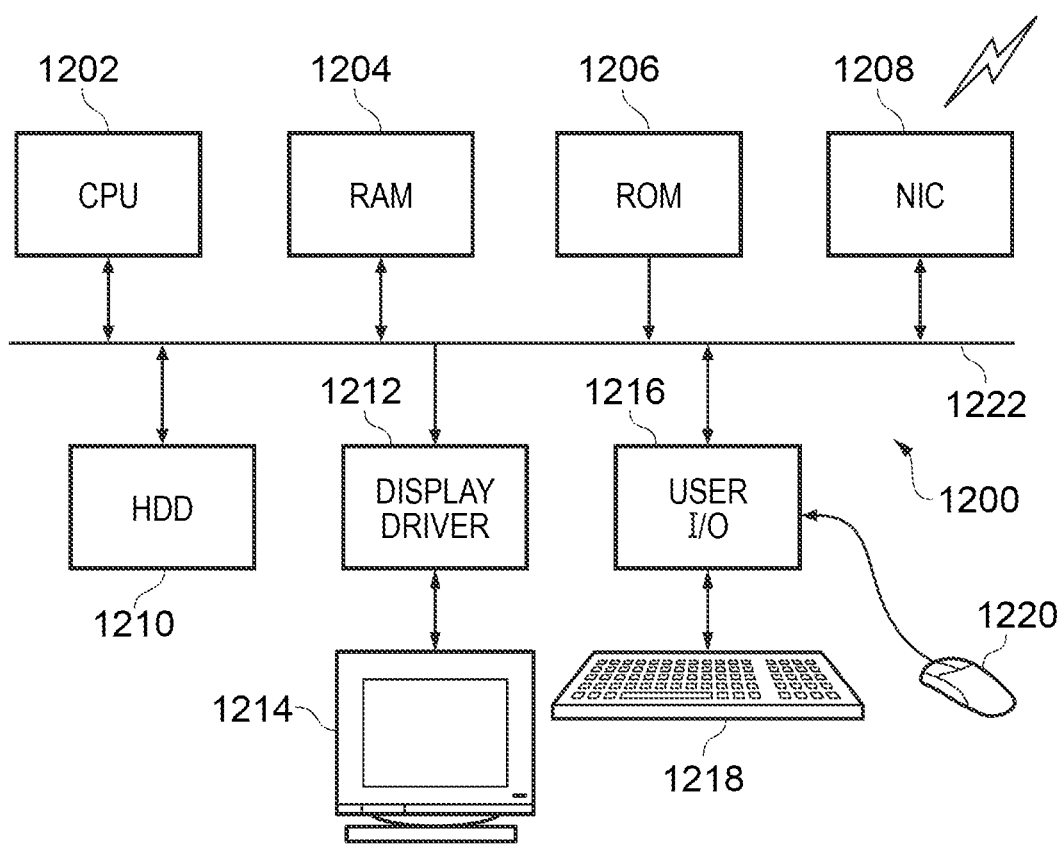
FIG. 14 schematically illustrates a general purpose computing device on which some example embodiments may be implemented.

FIG. 14 schematically illustrates a general purpose computing device on which some example embodiments may be implemented. The general purpose computer 1200 includes a central processing unit 1202, a random access memory 1204, a read only memory 1206, a network interface card 1208, a hard disk drive 1210, a display driver 1212 and monitor 1214 and a user input/output circuit 1216 with a keyboard 1218 and mouse 1220 all connected via a common bus 1222. In operation the central processing unit 1202 will execute computer program instructions that may be stored in one or more of the random access memory 1204, the read only memory 1206 and the hard disk drive 1210 or dynamically downloaded via the network interface card 1208. The results of the processing performed may be displayed to a user via the display driver 1212 and the monitor 1214. User inputs for controlling the operation of the general purpose computer 1200 may be received via the user input output circuit 1216 from the keyboard 1218 or the mouse 1220. It will be appreciated that the computer program could be written in a variety of different computer languages. The computer program may be stored and distributed on a recording medium or dynamically downloaded to the general purpose computer 1200. When operating under control of an appropriate computer program, the general purpose computer 1200 can perform some or all of the elements of the above described techniques and can be considered to form an apparatus for performing the above described techniques. Thus the monitoring of the software execution in the trusted environment may be administered using corresponding software on a device such as the general purpose computer 1200 and the execution of the software in the non-trusted environment may take place on a device such as the general purpose computer 1200. The architecture of the general purpose computer 1200 could vary considerably and FIG. 14 is only one example. Alternatively, the above-described techniques may be implemented in a more distributed fashion, wherein the general purpose computer 1200 illustrated in FIG. 14 may be expanded and/or replaced by an infrastructure comprising components implemented on separate physical devices, the separate physical devices sharing the processing required to carry out these techniques. Such separate physical devices may be physically proximate to one another, or may even be located at entirely different physical locations, i.e. such configurations may be implemented, at least in part, in a cloud computing arrangement.

In brief overall summary, techniques, supported by corresponding apparatuses and methods, are disclosed for monitoring execution of software and generating path signatures which are characteristic of the behaviour of the software. Multiple approximate nearest neighbour searching hash tables are generated in dependence on such path signatures. observed path signatures are also compared against the previously generated content of these runtime multiple approximate nearest neighbour searching hash tables and a behavioural classification is determined in dependence on hash collision-based similarity between the observed path signature and the content of the multiple approximate nearest neighbour searching hash tables.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

I claim:

1. Apparatus comprising:
    event capturing circuitry to monitor execution of software and to generate a series of event data in dependence on the execution of the software;
    path signature generation circuitry to generate an observed path signature dependent on the series of event data;
    runtime hash table storage to store runtime approximate nearest neighbour searching hash tables;
    hashing circuitry to perform a query-and-conditional-insert process on the runtime approximate nearest neighbour searching hash tables in dependence on the observed path signature; and
    behaviour indication circuitry to indicate a behavioural classification of the observed path signature in dependence on hash collision-based similarity between the observed path signature and content of the runtime approximate nearest neighbour searching hash tables.

2. The apparatus as claimed in claim 1, wherein the hash table storage comprises eviction circuitry, which is responsive to the query-and-conditional-insert process performed by the hashing circuitry, when the hash table storage is full, to evict least recently used entries of the hash table storage to allow insertion of entries for the observed path signature.

3. The apparatus as claimed in claim 1, wherein in the query-and-conditional-insert process inserting content corresponding to the observed path signature is conditional on the hash collision-based similarity determined with respect to the content of the runtime approximate nearest neighbour searching hash tables.

4. The apparatus as claimed in claim 1, wherein in the query-and-conditional-insert process inserting content corresponding to the observed path signature is conditional on a relative fullness of the runtime approximate nearest neighbour searching hash tables.

5. The apparatus as claimed in claim 1, further comprising:
    offline hash table storage to store offline approximate nearest neighbour searching hash tables, wherein the offline approximate nearest neighbour searching hash tables comprise entries provided by a trusted entity and wherein the entries correspond to at least one of:
    path signatures generated when a known attack is carried out on the software;
    path signatures generated when a known error occurs in the software;
    path signatures generated when known false positive behavioural classification occurs; and
    path signatures generated when common benign behaviours occur,
    wherein the hashing circuitry is configured to query the offline approximate nearest neighbour searching hash tables with the observed path signature,
    and wherein the behaviour indication circuitry is configured to indicate the behavioural classification of the observed path signature in dependence on hash collision-based similarity between the observed path signature and content of the offline approximate nearest neighbour searching hash tables.

6. The apparatus as claimed in claim 5, wherein the entries of the offline approximate nearest neighbour searching hash tables comprise attribute information defining behavioural classifications for the entries.

7. The apparatus as claimed in claim 5, further comprising:
    update circuitry configured to add entries to the offline approximate nearest neighbour searching hash tables,
    wherein prior to a start of monitoring execution of the software the offline hash table storage comprises unused storage capacity, and wherein the update circuitry is responsive to new entries provided by a trusted entity during execution of the software to add the new entries to the offline approximate nearest neighbour searching hash tables.

8. The apparatus as claimed in claim 5, wherein the behaviour indication circuitry is configured to prioritise the hash collision-based similarity between the observed path signature and content of the offline approximate nearest neighbour searching hash tables, when the runtime approximate nearest neighbour searching hash tables are not full.

9. The apparatus as claimed in claim 5, wherein the behaviour indication circuitry is responsive, when the runtime approximate nearest neighbour searching hash tables are full, and when the hash collision-based similarity between the observed path signature and the content of the runtime approximate nearest neighbour searching hash tables is below a recognition threshold to cause the hashing circuitry to query the offline approximate nearest neighbour searching hash tables with the observed path signature, and to transmit an indication of the observed path signature to the trusted entity.

10. The apparatus as claimed in claim 5, wherein the behaviour indication circuitry is responsive, when the runtime approximate nearest neighbour searching hash tables are full, and when the hash collision-based similarity between the observed path signature and the content of the runtime approximate nearest neighbour searching hash tables is above a recognition threshold to indicate the behavioural classification of the observed path signature as benign.

11. The apparatus as claimed in claim 5, wherein the hashing circuitry is configured to determine the hash collision-based similarity in dependence on a collision count of hash collisions between the observed path signature and a multiplicity of the offline approximate nearest neighbour searching hash tables.

12. The apparatus as claimed in claim 1, wherein in the query-and-conditional-insert process inserting content corresponding to the observed path signature is conditional on the hash collision-based similarity determined with respect to the content of the offline approximate nearest neighbour searching hash tables.

13. The apparatus as claimed in claim 1, wherein insertion of content corresponding to the observed path signature into the runtime approximate nearest neighbour searching hash tables comprises storing attribute information associated with hash table entries.

14. The apparatus as claimed in claim 13, wherein the attribute information associated with the entries comprises an indication of the hash collision-based similarity determined for the entries.

15. The apparatus as claimed in claim 1, further comprising:
a ping pong buffer comprising two event data buffers, wherein the two event data buffers are configured to alternately accumulate the series of event data,
and wherein the path signature generation circuitry is responsive to a full buffer of the two buffers to generate the observed path signature dependent on the series of event data in the full buffer.

16. The apparatus as claimed in claim 1, wherein the hashing circuitry comprises:
band mapping circuitry to perform a banding process on the observed path signature to map a subset of elements of the observed path signature into a path band according to a predefined mapping,
wherein the band mapping circuitry is configured to perform multiple versions of the banding process using multiple predefined mappings to generate multiple path bands,
and wherein the hashing circuitry is configured to generate the runtime approximate nearest neighbour searching hash tables by applying a hashing function to the multiple path bands.

17. The apparatus as claimed in claim 1, wherein the hashing circuitry is configured to determine the hash collision-based similarity in dependence on a collision count of hash collisions between the observed path signature and a multiplicity of the runtime approximate nearest neighbour searching hash tables.

18. A method of data processing comprising:
monitoring execution of software;
generating a series of event data in dependence on the execution of the software;
generating an observed path signature dependent on the series of event data;
storing runtime approximate nearest neighbour searching hash tables;
performing a query-and-conditional-insert process on the runtime approximate nearest neighbour searching hash tables in dependence on the observed path signature; and
indicating a behavioural classification of the observed path signature in dependence on hash collision-based similarity between the observed path signature and content of the runtime approximate nearest neighbour searching hash tables.

19. A computer-readable storage medium storing in a non-transient fashion software which when executed on a computing device causes the computing device to carry out the steps of:
monitoring execution of software;
generating a series of event data in dependence on the execution of the software;
generating an observed path signature dependent on the series of event data;
storing runtime approximate nearest neighbour searching hash tables;
performing a query-and-conditional-insert process on the runtime approximate nearest neighbour searching hash tables in dependence on the observed path signature; and
indicating a behavioural classification of the observed path signature in dependence on hash collision-based similarity between the observed path signature and content of the runtime approximate nearest neighbour searching hash tables.

* * * * *